United States Patent
Nakayama et al.

(10) Patent No.: US 7,124,258 B2
(45) Date of Patent: Oct. 17, 2006

(54) STORAGE SYSTEM AND STORAGE DEVICE SYSTEM

(75) Inventors: Shinichi Nakayama, Chigasaki (JP); Youichi Gotoh, Odawara (JP); Keishi Tamura, Odawara (JP)

(73) Assignee: Hitachi, Ltd., Tokyo (JP)

( * ) Notice: Subject to any disclaimer, the term of this patent is extended or adjusted under 35 U.S.C. 154(b) by 323 days.

(21) Appl. No.: 10/770,375

(22) Filed: Feb. 3, 2004

(65) Prior Publication Data

US 2005/0005066 A1 Jan. 6, 2005

(30) Foreign Application Priority Data

Jul. 3, 2003 (JP) ............... 2003-270619

(51) Int. Cl.
*G06F 12/16* (2006.01)
(52) U.S. Cl. ..................... 711/154; 711/141
(58) Field of Classification Search ............ 711/112, 711/114, 162, 154, 141; 714/5; 455/412; 360/70; 717/111; 380/261; 369/53
See application file for complete search history.

(56) References Cited

U.S. PATENT DOCUMENTS

| | | | | |
|---|---|---|---|---|
| 3,732,546 A | * | 5/1973 | Ronkin et al. ............ 360/70 |
| 4,941,201 A | * | 7/1990 | Davis .................. 455/41.2 |
| 5,297,208 A | * | 3/1994 | Schlafly et al. ........... 380/261 |
| 5,469,418 A | * | 11/1995 | Satoh et al. ............ 369/53.36 |
| 5,537,533 A | * | 7/1996 | Staheli et al. ............... 714/5 |
| 5,598,549 A | * | 1/1997 | Rathunde .................. 711/114 |
| 5,734,859 A | * | 3/1998 | Yorimitsu et al. ........ 711/112 |
| 6,052,797 A | | 4/2000 | Ofek et al. |
| 6,073,220 A | * | 6/2000 | Gunderson .............. 711/162 |
| 6,175,904 B1 | * | 1/2001 | Gunderson .............. 711/162 |
| 6,311,320 B1 | * | 10/2001 | Jibbe .................. 717/111 |
| 6,505,307 B1 | | 1/2003 | Stell et al. |
| 2003/0051111 A1 | | 3/2003 | Nakano et al. |
| 2004/0068628 A1 | | 4/2004 | Suzuki et al. |

FOREIGN PATENT DOCUMENTS

| | | |
|---|---|---|
| EP | 893763 A1 * | 1/1999 |
| JP | 06-334713 | 12/1994 |
| JP | 2000-347815 | 12/2000 |
| JP | 2002-049517 | 2/2002 |
| JP | 2002-149499 | 5/2002 |
| JP | 2002-259183 | 9/2002 |

\* cited by examiner

*Primary Examiner*—Pierre Bataille
*Assistant Examiner*—Paul Schlie
(74) *Attorney, Agent, or Firm*—Mattingly, Stanger, Malur & Brundidge, P.C.

(57) ABSTRACT

Under a hetero-environment in which different sorts of disk-systems are mixed with each other, a data guaranteeing operation can be carried out. When a cache controller of a local disk system receives a data writing request from a host computer the cache controller stores data into a local disk provided in a disk device group. The data received from the host computer is also transmitted to a remote disk system, and is stored in a remote disk. The data stored in the remote disk is immediately read and the data written in the remote disk is compared with the data written in the local disk. As a result, since a data guarantee operation on the remote side is processed by the local disk system instead of the remote disk system, a data guaranteeing operation when a remote copying operation is performed can be carried out even in the storage system under a hetero-environment.

34 Claims, 12 Drawing Sheets

STORAGE SYSTEM AND STORAGE DEVICE SYSTEM

CROSS-REFERENCE TO RELATED APPLICATIONS

This application relates to and claims priority from Japanese Patent Application No. 2003-270619, filed on Jul. 3, 2003, the entire disclosure of which is incorporated herein by reference.

BACKGROUND OF THE INVENTION

The present invention is related to a storage system and a storage device system that are capable of executing a remote copying operation between, for example, different sorts of a main storage device system and a sub-storage device system.

For instance, in basic business-purpose database systems of the type that are capable of handling large storage capacities of data, the data is managed by employing storage device systems which are independently arranged with respect to host computers. This storage device system is also referred to as a "disk array apparatus", which disk array apparatus is constituted by arranging a large number of disk storage devices in the form of an array. A storage device system is configured on the basis, for example, of RAID (Redundant Array of Independent Inexpensive Disks) technology. On a physical storage area owned by a storage device system, a logical volume corresponding to a virtual storage area Is formed. A business-purpose application program, that is operable on a host computer, can read or write desirable data by issuing either a write command having a predetermined format or a read command having a predetermined format to a storage device system.

For example, a description will be made of a case in which data is written. In this example, the result of a data operation by a host computer has been temporarily stored in a buffer of the host computer. When a series of data operations by the host computer is accomplished and the job is ended (commitment in unit of transaction), the host computer transmits a data writing request (write command) to a storage device system in order to update the database. This writing request contains one or more pieces (normally, a large number) of data which are to be written into the storage device system. Upon receipt of the data writing request from the host computer, the storage device system stores the data contained in this writing request into a cache memory. After addresses of the data stored in the cache memory are converted, the address-converted data is stored into a predetermined area of a preselected disk device. When the data which is required to be written has been stored in the predetermined area, the storage device system reports a writing operation completion to the host computer.

In this case, the storage device system can maintain the security of the data by causing the data to be distributed into a plurality of disk storage devices so as to increase the redundancy. Furthermore, the storage device system may execute a remote copying operation in which the same data is copied and held in storage device systems installed at physically separated remote places in order to take precautions against a disaster, such as an earthquake. In a remote copying operation, while a plurality of storage device systems, which are located under physically separated conditions, are connected via either a private line or a public line to each other, data is directly copied among the respective storage device systems without involving a host computer.

As a consequence, a main logical volume formed in a copy-source storage device system (to be referred to as "local-sided storage device system" hereinafter) corresponds to a sub-logical volume formed in a copy-destination storage device system (to be referred to as "remote-sided storage device system" hereinafter) in an one-to-one corresponding relationship, and these main and sub-logical volumes hold data having the same contents relative to each other. Accordingly, even in a case in which either all of the data or partial data of the local-sided storage device system is lost due to a disaster and the like, the host computer can execute a data processing operation by employing the data of the sub-logical volume of the remote-sided storage device system. It should be understood that a storage device system is designed in such a manner that a data backup operation is carried out in either a periodic manner or an irregular manner in addition to a remote copying operation, and, thus, the storage device system can restore the data up to a predetermined point in time based upon both backup data and journal data.

Remote copying operations may be mainly classified as a synchronous type remote copying operation and an asynchronous type remote copying operation. In the case of a synchronous type remote copying operation, when a data writing request issued from a host computer is transmitted to a local-sided storage device system, the local-sided storage device system stores the received data (namely, data which is required to be written) into a cache memory, and, thereafter, it transfers the data via a communication line to a remote-sided storage device system. When the remote-sided storage device system receives the data and stores the received data into a cache memory, the remote-sided storage device system transmits a response signal indicative of the data reception to the local-sided storage device system. When the local-sided storage device system receives the response signal from the remote-sided storage device system, the local-sided storage device system communicates a writing operation completion report that the data writing operation has been carried out under a normal condition to the host computer.

As explained above, in the synchronous type remote copying operation, both the data writing request issued from the host computer and the data transfer operation to the remote-sided storage device system are carried out in a synchronous manner. As a consequence, since such a delay time is produced, which is caused when the local-sided storage device system waits for the response sent from the remote-sided storage system in the synchronous type remote copying operation, this synchronous type remote copying operation is suitable for a case in which the distance between the local-sided storage device system and the remote-sided storage device system is a relatively short distance. Conversely, in a case in which the distance between a local-sided storage device system and a remote-sided storage device system is a long distance, generally speaking, the synchronous type remote copying operation is not suitable for use because of a delay response problem and a delay transfer problem.

On the other hand, in the case of an asynchronous type remote copying operation, when the local-sided storage device system receives a data writing request from the host computer, the local-sided storage device system stores the received data into the cache memory, and then it immediately communicates a writing operation completion report to the host computer. After the local-sided storage system sends the writing operation completion report to the host computer, this local-sided storage device system transfers the data to the remote-sided storage device system. In other words, the writing operation completion report to the host computer and the data transfer operation to the remote-sided storage device system are carried out in an asynchronous manner. As a consequence, in the case of an asynchronous type remote copying operation, the writing operation completion report can be quickly transmitted to the host computer irrespective of the distances between the respective storage device systems. Accordingly, this asynchronous type remote copying operation is suitable for a case in which the distance between the respective storage device systems is a relatively long distance. Conversely, since the data transfer operation to the remote storage device system has not yet been carried out at a time when the writing operation completion report to the-host computer is carried out, it is not guaranteed that the storage content of the main logical volume is identical to the storage content of the sub-logical volume even when the writing operation completion report is sent.

On the other hand, as one technique that is capable of improving the reliability of a storage device system, the storage device system can correctly store data in accordance with a data writing request made by a host computer and also can correctly read data in accordance with a data reading request made by the host computer. To this end, the storage device system employs such techniques, for example, as LRC (Longitudinal Redundancy Check), CRS (Cyclic Redundancy Check), and ECC (Error-Correcting Code) in order to prevent bit errors that tend to occur during a data transfer operation. However, since a plurality of disk storage devices are operated in a parallel mode so as to input/output data in the storage-device system, a predetermined address converting operation is carried out and the data is subdivided, and then the subdivided data is processed. As a result, it is difficult in practice to properly process abnormal addresses of subdivided data. As a consequence, such a guarantee technique has been proposed (refer to JP-A-2000-347815). That is, when a guarantee code, such as a transfer source address that is capable of specifying data to be transferred, is added to the data, a guarantee can be made as to whether or not the data can be correctly transferred within the storage device system.

In the above-described conventional technique, since the guarantee is made as to whether or not the data transfer operation has been correctly carried out within the storage device system by adding a guarantee code to the data, if a storage system is operable by employing a single storage device system, then the data guaranteeing operation may be sufficiently carried out. However, under a so-called "hetero-environment" in which different sorts of storage device systems are mixed with each other, there are many possibilities that the data guaranteeing systems are different from each other between the respective storage device systems, and also, even when similar data guaranteeing systems are employed, the detailed structures of the data guarantee codes and the detailed verifying methods employed are different from each other. As a consequence, it is difficult in practice to guarantee as to whether or not data which has been transferred from a certain storage device system to another storage device system is correctly stored, or it is difficult to guarantee as to whether or not data which has been read from a certain storage device system to another storage device system corresponds to correct data. In this connection, the above-described hetero-environment implies, for instance, an environment in which plural sorts of storage device systems whose suppliers are different from each other are mixed with each other. For example, this hetero-environment implies a storage environment in which, although basic functions related to data input/output operations of different sorts of storage device systems are commonly used in these storage device systems, the peripheral support functions thereof, such as the guarantee functions during data transfer operations, are different from each other, and these different sorts of storage device systems are mutually connected so as to be operated together in a system.

In a case in which a single storage system is configured only by a plurality of storage device systems which are provided by the same supplier, the above-explained error correcting technique above, such as LRC, is sufficient as a bit error preventing technique, and also, no consideration has been made as to whether or not the data transferred between the respective storage device systems is correctly stored, and whether or not the data transferred between the respective storage device systems corresponds to correctly read data. Also, since the supplier is familiar with the internal constructions of the respective storage systems, even in a case in which the versions and processing performance of the respective storage device systems are different from each other, the data transferred between the respective storage device systems may be guaranteed in a relatively simple manner, if necessary.

However, under the hetero-environment in which plural sorts of storage device systems whose suppliers are different from each other are mixed with each other, it is difficult to guarantee as to whether or not the data transferred between the storage device systems of the respective suppliers corresponds to the correct data, except for a case in which the respective different suppliers employ the same data guarantee system. The reason for this is given as follows: That is, a data guarantee system which is employed by a certain supplier cannot be directly applied to another storage device system supplied by another supplier. Also, the internal structure of a storage device system which is supplied by another supplier cannot be freely altered. As a consequence, under a hetero-environment the reliability of the data which is transferred among the storage device systems whose technical specifications and performance are different from each other cannot be sufficiently secured, and, therefore, improvements in the data reliability are required.

SUMMARY OF THE INVENTION

The present invention has been made to solve the above-described problems, and, therefore, it has an object to provide both a storage system and a storage device system that are capable of guaranteeing data that has been transferred between respective storage device systems in such a storage system in which different sorts of storage device systems are mixed with each other.

Another object of the present invention is to provide a storage system in which an operation of a storage device system having a low function can be carried out by a storage device system having a high function, instead of this storage device system having the low function, in a storage system in which plural sorts of storage device systems are connected to each other, the support functions of which are different from each other. Further objects of the present invention will become more apparent from the following description of various embodiments.

To solve the above-described problems, a storage system, according to the present invention, is arranged by connecting a main storage system to a sub-storage system, which is of a different sort from that of the main storage system, for transmitting/receiving data between an upper grade apparatus and its own storage system; in which: the main-storage device system comprises: receiving means for receiving a data writing request from the upper grade apparatus; data holding means for holding data which is required to be written in response to the received data writing request; transferring means for transferring the data which is required to be written to the side of the sub-storage system in response to the received data writing request, and data guaranteeing means for guaranteeing as to whether or not the data held on the side of the sub-storage system corresponds to correct data.

The main storage device system holds a main data group which is used by the upper grade apparatus, whereas the sub-storage device system holds a sub-data group which is produced by copying the main data group in a one-to-one corresponding relationship. The main storage device system and the sub-storage device system are supplied by, for example, separate suppliers (manufacturers) and are of different sorts from each other. A difference in sorts implies a case in which there is a difference as to at least the data guarantee functions between the respective main/sub-storage device systems.

When the main storage device system receives the data writing request from the upper-grade unit, the main storage device system holds the received data in its own system and also transfers the received data to the sub-storage device system. Furthermore, the main storage device system verifies whether or not the data held by the sub-storage device system corresponds to the correct data by use of the data guaranteeing means and guarantees the data. In other words, the main storage device system verifies as to whether or not the data transferred to the sub-storage device system is held therein in the correct manner, or whether or not the data read out from the sub-storage device system corresponds to the correct data, and it guarantees the data.

As previously explained, in the storage system according to the present invention, the main storage device system may execute a data guaranteeing operation of the sub-storage device system instead of this sub-storage device system. As a consequence, in a case in which the main storage device system is connected to the sub-storage device system which is of a different sort from that of the main storage device system; more specifically, even in a case in which the main storage device system is connected to a sub-storage device system which is not equipped with a data guarantee function usable by the main storage device system, the main storage device system can guarantee the data which is transferred to the sub-storage device system and can improve the reliability of the storage system.

In connection therewith, the above-explained case, in which, the sub-storage device system is not equipped with a data guarantee function that is usable by the main storage device system, may involve a case in which the sub-storage device system is not originally equipped with a data guarantee function. It should be noted that the writing operation completion report to the upper grade apparatus may be sent at the same time when the data is transferred to the sub-storage device system in response to the data guarantee method (namely, a synchronous processing operation), or it may be sent irrespective of the data transfer operation to the sub-storage device system (namely, an asynchronous processing operation).

In accordance with an aspect of the present invention, the above-described data guaranteeing means executes a data guaranteeing operation in such a manner that the data which has been transferred to the sub-storage device system is read out from the sub-storage device system, and the read data is compared with the data held in the data holding means.

In other words, for example, after the data has been transferred from the main storage device system to the sub-storage device system, since this transferred data is read from the sub-storage device system so as to be identified with respect to the original data, the main storage device system may verify whether or not the data is being correctly held in the sub-storage device system, and then it may guarantee the data. The sub-storage device system may be merely equipped with a function in which this sub-storage device system holds the data transferred from the main storage device system; and, it transfers the data in response to the read request issued from the main storage device system, and, thus, it need not be additionally equipped with a new function used to guarantee the data.

In accordance with another aspect of the present invention, the above-described data guaranteeing means comprises: guarantee code producing means for producing a guarantee code based upon the data which is required to be written in a case in which the receiving means receives a data writing request; guarantee code holding means for holding the produced guarantee code; extracting means for extracting a guarantee code based upon the data read out from the sub-storage device system and comparing means for performing a data guaranteeing operation by comparing the guarantee code held by the guarantee code holding means with the guarantee code extracted by the extracting means.

In other words, when the main storage device system receives a data writing request from the upper grade apparatus, the main storage device system produces a guarantee code based upon the data which is requested to be written. This guarantee code is based upon an attribute (for example, logical address and error-correcting redundant code) of the data which is requested to be written. The produced guarantee code is held only in the main storage device system, and only the data is transferred to the sub-storage device system. In the case in which the data is read out from the sub-storage device system, the guarantee code is extracted based upon this read data, and then, this extracted guarantee code is compared with the guarantee code which has been held in the main storage device system. In the case where the two sets of the guarantee codes for the main system side and the sub-system side are coincident with each other, the data guaranteeing means indicates that the data transfer operation has been carried out in the correct manner; whereas, in the case where the two guarantee codes for the main system side and the sub-system side are not coincident with each other, the data guaranteeing means can judge that an error has occurred.

In accordance with a further aspect of the present invention, the above-explained data guaranteeing means comprises: guarantee code producing means for producing a guarantee code based upon the data which is required to be written in the case in which the receiving means receives a data writing request; guarantee code holding means for holding the produced guarantee code; transferring means, which is operated in such a manner that, while both the produced guarantee code and the data which is required to be written are related to each other as data to which a guarantee code is attached, the data with the attached guarantee code is transferred to the sub-storage device system by the transferring means; extracting means for extracting the guarantee code from the data with the attached guarantee code read out from the sub-storage device system; and comparing means for executing a data guarantee operation by comparing the guarantee code held by the guarantee code holding means with the guarantee code extracted by the extracting means.

In other words, when the main storage device system receives a data writing request from the upper grade apparatus, the main storage device system produces a guarantee code based upon the received data, and it holds this produced guarantee code. Furthermore, the main storage device system causes the produced guarantee code to be related to the received data so as to form "data appended with a guarantee code", and then transfers this data with the appended guarantee code to the sub-storage device system. Then, the main storage system reads the data attached with the appended guarantee code from the sub-storage device system, and extracts the guarantee code from this read data. The data guaranteeing means judges as to whether or not the data has been correctly held in the sub-storage device system by comparing the guarantee code which is extracted from the data to which the guarantee code read out from the sub-storage device system is appended with the guarantee code which has been held in the main storage device system, and in this way it can guarantee the data.

In this case, the above-described data with the appended guarantee code may be constituted in such a manner that this data is recognized as the data which is required to be written. In other words, while the guarantee code is not appended to the outside of the received data from the upper grade apparatus, the guarantee code is combined with the received data in an internal form. As a result, the data with the appended guarantee code pretends to be received data from the upper grade apparatus. As a consequence, in a case in which the data length of received data is previously fixed to a predetermined value (for example, 512 bits), the data length of the received data becomes longer than the standard data length by such a data length used to combine this received data with the guarantee code in an integral form.

In accordance with another aspect of the present invention, the above-described storage system is comprised of data guarantee selecting means for controlling the operation of the data-guaranteeing means. In this connection, the controlling operation for controlling the operation of the data guaranteeing means involves both a selecting operation as to whether or not the data guaranteeing operation is parried out by the data guaranteeing means, and the mode selecting operation executed in case the data guaranteeing operation is carried out. Also, such a selection may be alternatively made in a case in which the data guaranteeing operations are carried out in different modes for every sub-storage device system.

In the storage system according to the present invention, since the data guaranteeing operation of the sub-storage device system is also carried out on the side of the main storage device system in a batch manner, the work load processed by the main storage device system is increased. As a consequence, the data guaranteeing operations are not uniformly carried out with respect to all of the sub-storage device systems which constitute the storage system, but it is preferable that the data guaranteeing operation may become active, if required, by considering the processing performance and the memory capacity of the main storage device system.

In accordance with another aspect of the present invention, the data guaranteeing means is provided with a plurality of data guarantee modes; and the data guarantee selecting means selects at least any one of the plural data guarantee modes. That is to say, for example, while the processing performance and the memory capacity of the main storage device system are considered, the data guarantee mode may be automatically selected, or it may be selected by a manual operation of the user. Also, the data guarantee mode may be alternatively selected for every application or every sub-storage device system. Since the proper data guarantee mode is set (involving a case in which the data guaranteeing operation is not carried out), the storage system can be operated with a higher efficiency while the reliability of this storage system is maintained.

The above-described data guaranteeing means is provided with at least two or more guarantee modes, among which are: (1) a first guarantee mode for executing a data guaranteeing operation in such a manner that the data which is required to be written is transferred to the sub-storage device system so as to be held therein, the data held in the sub-storage system is read, and the read data is compared with the data held in the main storage device system; (2) a second guarantee mode for performing a data guaranteeing operation in such a manner that the guarantee code produced based upon the data which is required to be written is held in the main storage device system, and the guarantee code extracted from the data read out from the sub-storage device system is compared with the guarantee code held in the main storage device system; and (3) a third guarantee mode for executing a data guaranteeing operation in such a manner that the guarantee code produced based upon the data which is required to be written is held in the main storage device system, the data attached with the guarantee code, which is constituted by relating the guarantee code to the data, is transferred to the sub-storage device system so as to be held therein, and the guarantee code which is extracted from the data attached with the guarantee code read out from the sub-storage device system is compared with the guarantee code held in the main storage device system.

In other words, the first guarantee mode executes a data guaranteeing operation in such a manner that the data transferred to the sub-storage device system is immediately read therefrom, and this read data is identified with respect to the data which is held in the main storage device system. This first guarantee mode can be realized by a simple arrangement, and it can be easily conducted, while the load processed by the main storage device system is low. However, since the data is read so as to be identified with the held data every time the data is transferred to the sub-storage device system, the response to a writing request issued from the upper grade apparatus (namely, transmission of writing operation completion report) is delayed. As a result, this first guarantee mode may become effective in a case in which the distance between the main storage device system and the sub-storage device system is a relatively short distance, and also, in a case where there is a lack of the processing performance by the main storage device system. Also, in the first guarantee mode, when the data is transferred to the sub-storage device system, namely at a point in time when the remote copying operation is carried out in the sub-storage device system, the data guaranteeing operation is carried out, whereas the data guaranteeing operation is not carried out when the data is read out from the sub-storage device system. As a result, the reliability of the data guaranteeing operation is relatively lowered.

In the second guarantee mode, the main storage device system produces a guarantee code based upon the data received from the upper grade apparatus; and, then it manages the produced guarantee code and transfers only the received data to the sub-storage device system. As a consequence, the data guaranteeing operation can be carried out by comparing the guarantee codes with each other when the data is read out from the sub-storage device system. Thus, the reliability of this second guarantee mode may be higher than that of the first guarantee mode. However, since the guarantee codes must be managed on the side of the main storage device system, the work load processed by this main storage device system is increased mainly due to this management of the guarantee codes.

In the third guarantee mode, the guarantee code produced by the main storage device system is caused to be related to the data received from the upper grade apparatus so as to be formed as data with an appended guarantee code, and then, this data with the appended guarantee code is transferred to the sub-storage device system so as to be held therein. Since the guarantee code has been added to the data, the highest reliability of the data guaranteeing operation ca be obtained. However, the storage capacity of the sub-storage device system is suppressed by the capacity of the guarantee code added to the data. Also, since it is pretended that the entire data with the appended guarantee code may constitute data received from the upper grade apparatus, the guarantee code is no longer separated from the data and the guarantee code is no longer separately managed. However, the resulting data size is increased only by the guarantee code. There are some possibilities that the format of this size-increased data becomes different from the format of the storage area of the sub-storage device system. As a result, when the third guarantee mode is applied to the existing storage area, a technical concept must be adopted, for instance, wherein all of the existing data are read from the existing storage area, and then, the formats of the read data are rearranged.

A storage system, according to another aspect of the present invention, is featured in that a plurality of different sorts of storage device systems are mixed with each other, and the support functions thereof related to data input/output operations are different from each other; in which a storage device system having a high function among the plural sorts of storage device systems executes a predetermined support function for a storage device system having a low function among the plural sorts of storage device systems, instead of the storage device system having the low function.

The support function related to the data input/output operations implies a function in which a basic function corresponding to data input/output operations is directly or indirectly supported. As this support function, a data guarantee function may be conceived which may guarantee whether or not correct data is handled when data is inputted and when data is outputted. In a storage system which is constituted by connecting a plurality of storage device systems to each other, the basic data input/output functions of which are commonly used, there are some cases in which secondary support functions are different from each other for every storage device system because of, for example, differences which exist in the design concepts of the respective suppliers of these storage device systems. Also, there are differences as to CPU performance and installed memory capacities of the storage device systems, and also as to program components installed in the respective storage device systems with respect to the suppliers thereof. Under such a circumstance, in the storage system according to the present invention, a storage device system having the high function among the different sorts of storage device systems executes a predetermined support function for the storage device system having the low function, instead of the storage device system having the low function. In other words, the predetermined support function employed in the storage device system having the low function is executed by the storage device system having the high function (high performance) and which is capable of supporting another storage device system. As a result, the storage device system having the high function can mainly perform the predetermined support function, and it can secure a predetermined reliability even under an environment in which plural sorts of storage device systems are mixed with each other.

For example, the above-described storage device system having a high function is comprised of: judging means for judging whether or not a predetermined event for executing a predetermined support function happens to occur; and substituting process means operated in such a manner that in the case where the judging means judges that a predetermined event happens to occur, the predetermined support function is executed by the storage device system having the high function, instead of the storage device having the low function.

The above-explained substituting process means executes the predetermined support function by way of either a synchronous processing operation or an asynchronous processing operation.

In this case, the synchronous processing operation implies that the timing at which a predetermined event for executing a predetermined support function occurs is substantially synchronized with the timing at which the predetermined support function is carried out. The asynchronous processing operation implies that the occurrence of a predetermined event is not synchronized with the execution of a predetermined support function, but that they are carried out at separate timings.

The above-described substituting process means executes the predetermined support function without adding redundant data to the data related to the predetermined support function, or by adding redundant data originated from the data related to the predetermined support function to the data related to the predetermined support function.

For instance, there are some cases in which the substituting process means may execute a predetermined support function by changing a data operating method without adding any redundant data to data related to the predetermined support function. Also, there is a certain case in which the substituting process means may perform a predetermined support function by adding redundant data (for example, redundant data originated from data) related to the predetermined support function.

In accordance with one aspect of the present invention, the storage system is provided with the above-described selecting means for selecting the operation modes of the substitution process operations of the predetermined support function by the substituting process means.

The operation modes also contain a case in which the substituting process operation of the predetermined support function is not carried out. Since the proper operation mode is selected by considering the processing performance and the memory capacity of the storage device system having a high function, the storage system in which different sorts of storage device systems are mixed with each other can be operated with a higher efficiency, while the utility of this storage system is increased.

A storage device system, according to another aspect of the present invention, is featured by a storage device system connected to an upper grade apparatus and different sorts of storage device systems, respectively, in which the storage device system is arranged to include: receiving means for receiving a data writing request from the upper grade apparatus; data holding means for holding data which is required to be written in response to the received data writing request; transferring means for transferring the data which is required to be written to the side of different sorts of storage device systems in response to the received data writing request; and data guaranteeing means for guaranteeing whether or not the data held on the side of the different sorts of storage device systems corresponds to correct data.

The above-described data guaranteeing means may execute the data guaranteeing operation in such a manner that the data which has been transferred to the different sorts of storage device systems is read out from said different sorts of storage device systems, and the read data is compared with the data held in the data holding means.

Also, the above-explained data guaranteeing means may comprises: guarantee code producing means for producing a guarantee code based upon the data which is required to be written in case the receiving means receives a data writing request; guarantee code holding means for holding the produced guarantee code; extracting means for extracting a guarantee code based upon the data read out from the different sorts of storage device systems; and comparing means for performing a data guaranteeing operation by comparing the guarantee code held by the guarantee code holding means with the guarantee code extracted by the extracting means.

Furthermore, the above-described data guaranteeing means may comprise: guarantee code producing means for producing a guarantee code based upon the data which is required to be written in case the receiving means receives a data writing request; guarantee code holding means for holding the produced guarantee code; data-attached-with-guarantee-code transferring means that is operated in such a manner that, while both the produced guarantee code and the data which is required to be written are related to each other as data with an attached guarantee code, the data with the attached guarantee code is transferred to the different sorts of storage device systems by the transferring means; extracting means for extracting the guarantee code from the data with the attached guarantee code that is read out from the different sorts of storage device systems; and comparing means for executing the data guarantee operation by comparing the guarantee code held by the guarantee code holding means with the guarantee code extracted by the extracting means.

A program, according to a further aspect of the present invention, is featured by controlling a storage device system connected to an upper grade apparatus and different sorts of storage device systems, respectively, in which the program realizes: a local-sided holding function by which, in response to a data writing request received from the upper grade apparatus, data which is required to be written is held in storage means; a transferring function by which, in response to the received data write request, the data which is required to be written is transferred to the different sorts of storage device systems so as to be held therein; and a data guaranteeing function for guaranteeing whether or not the data held in the different sorts of storage device systems corresponds to correct data.

DESCRIPTION OF THE PREFERRED EMBODIMENTS

Referring now to FIG. 1 to FIG. 12, various embodiments of the present invention will be described.

[Embodiment 1]

Figure 1:
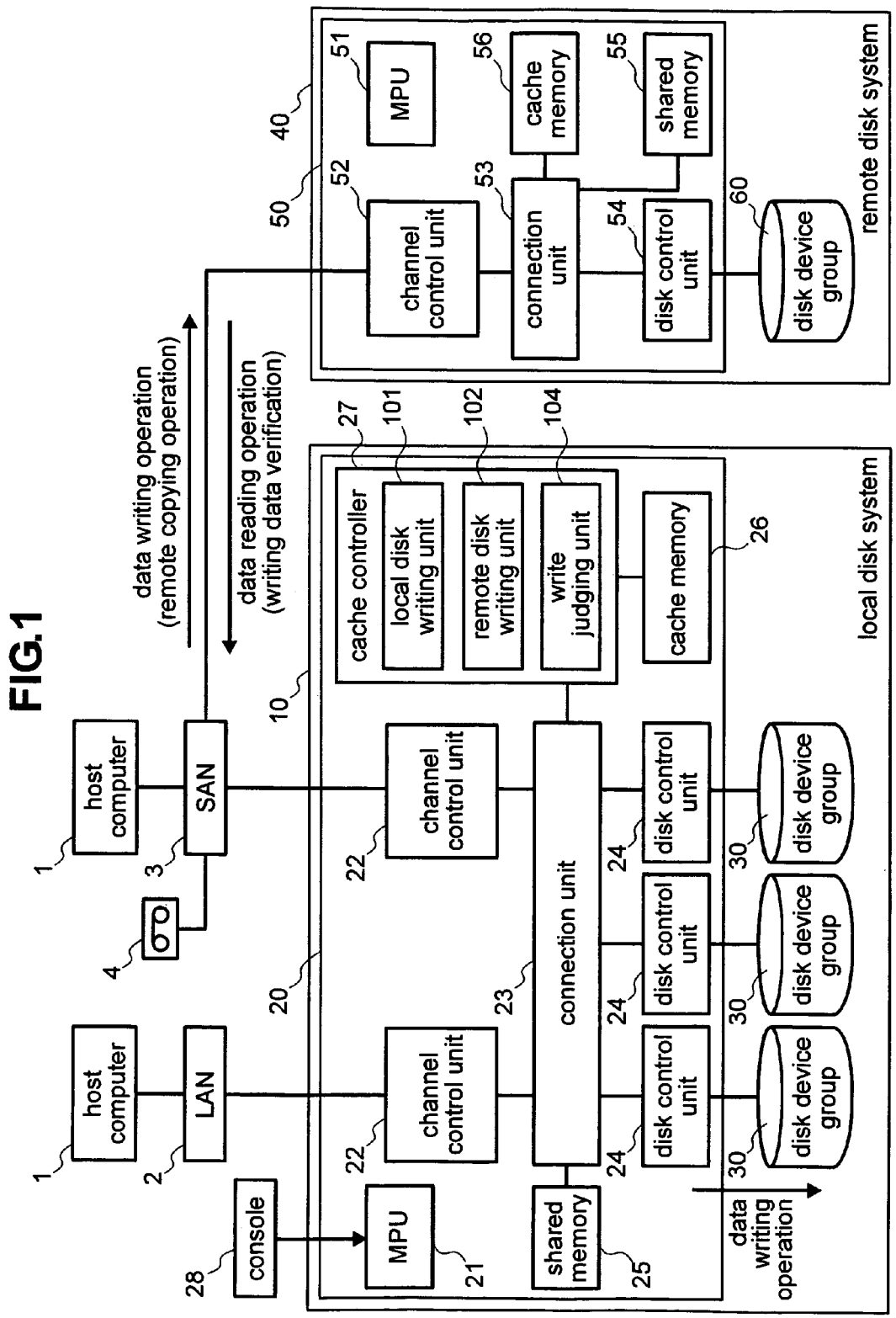
FIG. 1 is a block diagram showing the overall arrangement of a storage system according to a first embodiment of the present invention.
Figure 2:
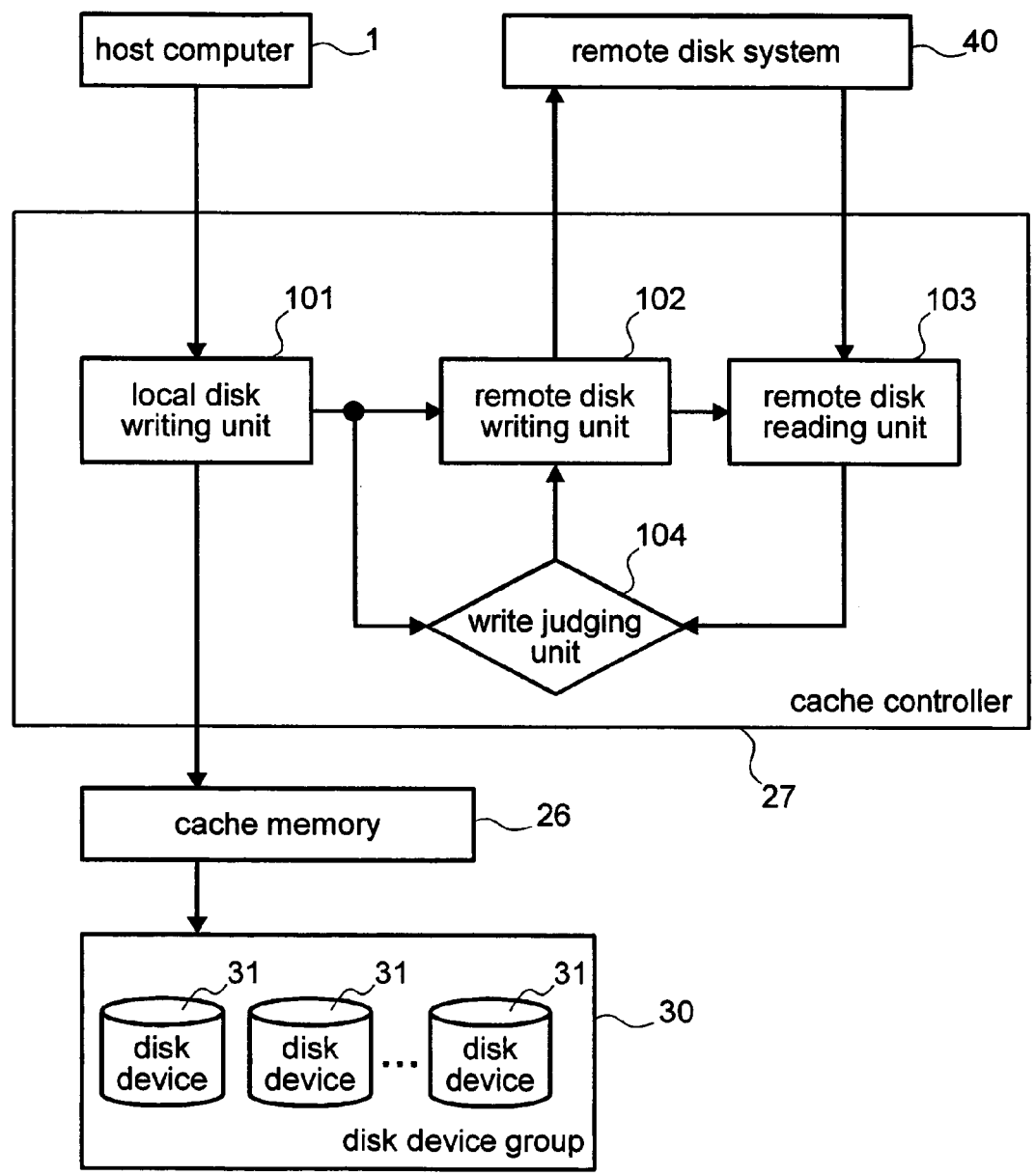
FIG. 2 is a block diagram showing a major unit of a local disk system.
Figure 3:
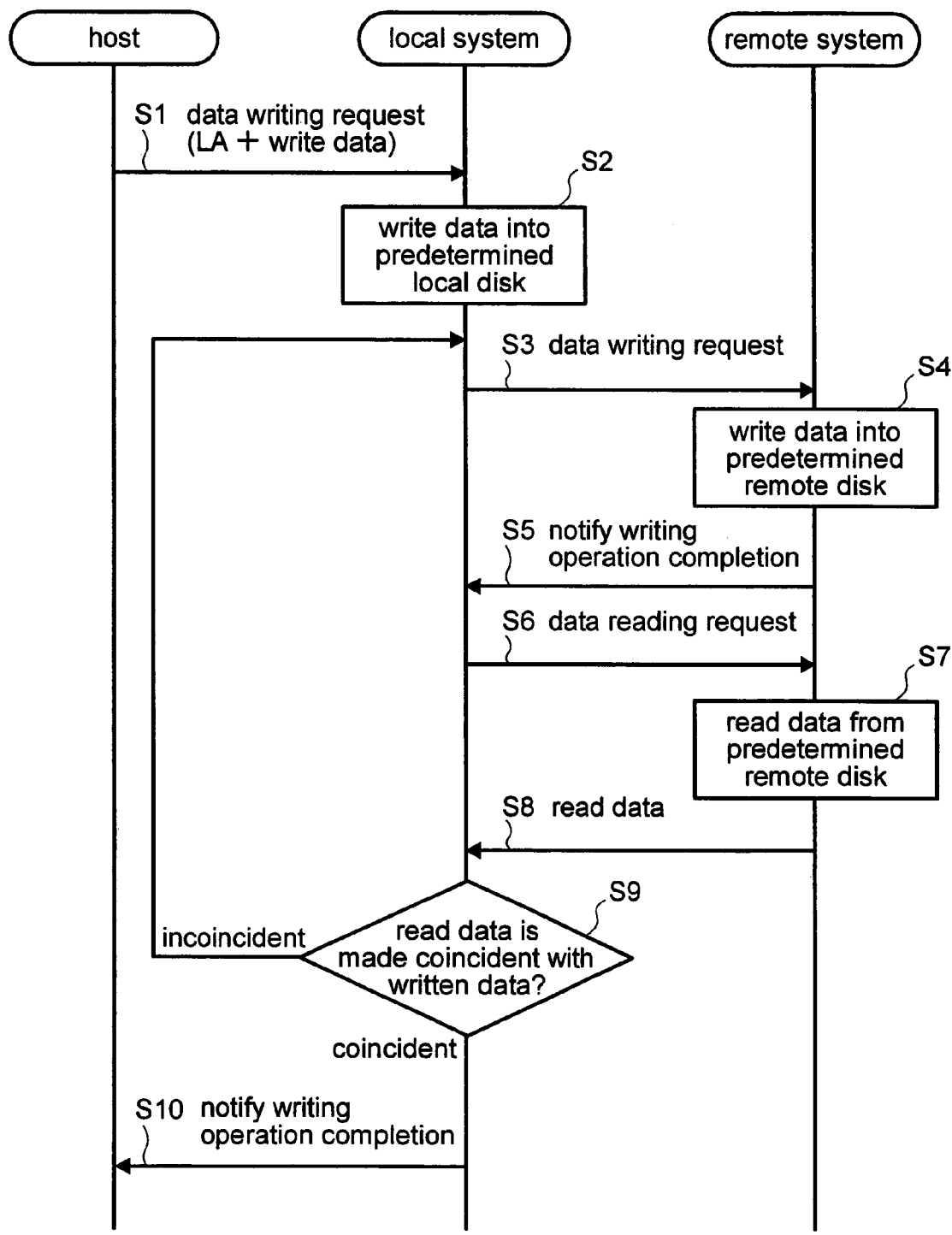
FIG. 3 is a time chart illustrating the overall operation of the storage system.

A first embodiment of the present invention will be described with reference to FIG. 1 to FIG. 3. A storage system according to this embodiment is made up of a main storage device system 10 connected to a sub-storage device system 40, which is of a different sort from that of the main storage system 10, both of which are utilized by a host computer 1.

The host computer 1 corresponds to a computer system equipped with, for example, a CPU (Central Processing Unit), a memory, and the like. Since the CPU of the host computer 1 executes various sorts of programs, various sorts of functions are realized. The host computer 1 is provided, for instance, in the form of a personal computer, a workstation, or a main frame computer.

A certain host computer 1 may be connected via a LAN (Local Area Network) 2 to the storage device system 10. Also, another host computer 1 may be alternatively connected via an SAN (Storage Area Network) 3 to the storage device systems 10 and 40, respectively. Also, the host computer 1 may be alternatively and directly connected via a private line (not shown) to the storage device system 10.

The LAN 2 may be realized as, for example, a network, such as the Internet, or an exclusively-used network. Data communication is executed via the LAN 2 in accordance with, for example, the TCP/IP (Transmission Control Protocol/Internet Protocol) protocol. Since the host computer 1 connected to the LAN 2 transmits a predetermined command with respect to the storage device system 10, the host computer 1 can execute a data access request by designating a file name (data input/output request in the unit of a file).

The SAN 3 is employed so as to transmit/receive data, while a block corresponding to a data management unit of a storage area provided by either a disk device-group 30 or another disk device group 60 is used as a unit. In general, a communication which is executed via the SAN 3 is controlled in accordance with a fiber channel protocol. The host computer 1 connected to the SAN 3 issues a data access request in the unit of a block in accordance with the fiber channel protocol.

Although only a "SAN 3"—sided arrangement is illustrated, a backup apparatus 4 is connected to each of the LAN 2 and the SAN 3. As the backup apparatus 4, for instance, disk-system storage devices, such as an MO (Magneto-Optical) storage device, a CD-R (CD-Recordable compact disk), a DVD-RAM (Digital Versatile Disk-RAM) may be used, and tape-system storage devices, such as a DAT (Digital Audio Tape), a cassette tape, an open reel tape, and a cartridge tape may be employed. Since the backup apparatus 4 is able to communicate with the disk device group 30, data which has been stored in the disk device group 30 may be duplicated as backup data in either a periodic manner or an irregular manner.

This storage system is provided with the storage device systems 10 and 40, which are of a different sort from each other. Although this storage system may be alternatively constituted by larger numbers of storage device systems, for the sake of easy explanation, a storage system having two sets of storage device systems 10 and 40 will now be considered as an example.

One storage device system 10 corresponds to a local disk system (primary site) which is installed in proximity to the host computer 1, and a main logical volume is logically formed in the disk device group 30 of this local disk system. The other storage device system 40 corresponds to a remote disk system (secondary site) which is installed at a place remote from the local disk system, and a sub-logical volume corresponding to the main logical volume is formed in the disk device group 60 of this remote disk system.

It should be understood that the main storage device system 10 will be referred to as a "local disk system", whereas the sub-storage device system 40 will be referred to as a "remote disk system" hereinafter. In this connection, the suppliers (manufacturers) of the respective local disk system 10 and remote disk system 40 are assumed to be different from each other, and the basic specifications thereof related to data input/output operations are commonly available. However, the support functions, such as data guarantees of the local disk system 10 and the remote disk system 40, are different from each other. In other words, the storage system shown in this drawing constitutes a hetero-environment in which the disk systems 10 and 40, which are of different sorts from each other, are mixed with each other in the storage system.

First, a description will be given of the arrangement of the local disk system 10. The local disk system 10 is mainly separated into a control apparatus 20 and a plurality of disk device groups 30, which are controlled by the control apparatus 20. As will be explained later, the control apparatus 20 may be arranged by employing an MPU (Microprocessor Unit) 21, one or more channel control units 22, a connection unit 23, a plurality of disk control units 24, a shared memory 25, a cache memory 26, and a cache controller 27. The control apparatus 20 controls the disk device groups 30 in response to various sorts of commands which are received from the host computer 1. For instance, when the control apparatus 20 receives an input/output request of data from the host computer 1, the control apparatus 20 executes input/output processing of data stored in the disk device groups 30. A logical volume (Logical Unit) corresponding to a logical storage area has been set on a physical storage area, which is provided by a plurality of disk storage devices 31, which are equipped in each of the disk device groups 30.

The MPU 21 is mutually connected to various circuits such as the respective channel control units 22, the respective disk control units 24, the shared memory 25, the cache controller 27, and the like by way of an internal LAN (not shown). Since the MPU 21 reads program codes stored in a program memory (not shown) and then executes the read program codes, the MPU 21 controls the overall operation of the control apparatus 20. Also, a console 28 is connected to the MPU 21, and it becomes a man-to-machine interface of the local disk system 10. A user may select data guarantee modes (to be discussed later) via the console 28.

Each of the channel control units 22 is used to establish data communication between the control apparatus 20 and a respective one of the host computers 1. Each of the channel control units 22 has a communication interface which is used to communicate with the host computer 1 that is connected to each of these channel control units 22. Also, each of the channel control units 22 is equipped with a command processor function, and this command processor function interprets/processes various sorts of commands which are received from the host computer 1. Network addresses (for example, IP addresses) have been allocated to the respective channel control units 22 in order to individually identify these channel control units 22. The respective channel control units 22 may individually behave as NASs (Network Attached Storages). As a consequence, the respective channel control units 22 individually accept data input/output that are requests issued from the respective host computers 1. The respective channel control units 22 are realized by hardware circuits, software, and the like.

The connection unit 23 is arranged as a high speed bus, such as, for instance, an ultra-high speed crossbar switch which performs a data transfer operation by a high speed switching operation. The connection unit 23 is mutually connected to the respective channel control units 22, the respective disk control units 24, the shared memory 25, and the cache controller 27. The transmitting/receiving of data and commands among the respective channel control units 22, the respective disk control units 24, and the cache controller 27 are carried out via the connection unit 23.

The respective disk control units 24 control the respective disk device groups 30. For instance, a disk control unit 24 writes data at a predetermined address of a disk device group 30 in response to a write request which is received by the channel control unit 22 from the host computer 1. Also, the disk control unit 24 converts a data access request of a logical volume to a data access request with respect to a physical disk by converting a logical address into a physical address. Furthermore, in case the disk device groups 30 are managed by way of RAID arrangement, the disk control unit 24 executes a data access operation in accordance with a RAID structure. Also, the disk control unit 24 performs a duplication managing control operation and a backup control operation as to data which has been stored in the disk device groups 30. Furthermore, the disk control unit 24 executes another control operation (referred to as either replication function or remote copy function) under which data is also stored into another storage device system 40 added thereto in order to prevent data disappearance when a disaster happens to occur (disaster recovery).

Both the shared memory 25 and the cache memory 26 correspond to storage memories which are commonly used by the respective channel control units 22, the respective disk control units 24, and the like. While control information, commands, and the like are mainly stored into the shared memory 12, this shared memory 12 is used as a work area and the like. The cache memory 26 is mainly used so as to store thereinto data received from the host computer 1 and data read out from the disk device groups 30. In the case that, for example, the channel control unit 22 receives a write request command from the host computer 1, the channel control unit 22 writes this write request command into the shared memory 25, and it writes write data received from the host computer 1 into the cache memory 26. On the other hand, the disk control unit 24 monitors the shared memory 25. When the disk control unit 24 detects that a write command is written into the shared memory 25, this disk control unit 22 reads write data from the cache memory 26 in response to this write command, and then writes the read data into the disk device group 30.

The cache controller 27 manages input/output operations of data with respect to the cache memory 26. The respective channel control units 22 and the respective disk control units 24 perform data writing operations and data reading operations via the cache controller 27 with respect to the cache memory 26. Although a detailed operation will be explained later with reference to FIG. 2, in this embodiment, data which is copied to the remote disk system 40 is guaranteed in the cache controller 27. However, the present invention is not limited to this guarantee operation. For example, it is also possible that the MPU 21 may in the alternative perform a data guarantee operation, or the channel control unit 22 may in the alternative execute a data guarantee operation.

Next, the console 28 will now be explained. When a user enters an instruction via the console 28 to the MPU21, this MPU 21 executes an environment setting operation of the local disk system 10 in response to the instruction sent from the user. Also, various sorts of status information and the like of the local disk system 10 are provided to the user via the screen of the console 28. More particularly, since the user manipulates the console 28, the user may set a logical volume, may increase or decrease the disk storage devices 31, and may change the RAID structure. Also, the user may confirm an operating condition of the local disk system 10 and may monitor the occurrence of a disaster via the screen of the console 28.

The disk device group 30 is constituted by a large number of disk storage devices 31 arranged in an array shape, and it may provide storage areas which are managed by RAID with respect to the host computer 1. As the disk storage device 31, for instance, various sorts of devices, such as hard disk devices, flexible disk devices, and semiconductor storage devices, may be employed. As indicated in FIG. 1, the respective disk control units 24 may be directly connected to the respective disk device groups 30. Otherwise, the respective disk control unit 24 may be indirectly connected via a network to the respective disk device groups 30. Alternatively, both the disk device groups 30 and the disk control units 24 maybe constituted in an integral form. A logical volume set to a disk device group 30 contains a user disk, which can be accessed from the host computer 1, and a system disk, which is used so as to control the channel control unit 22. Alternatively, a single logical volume may be allocated to each of the channel control units 22. Further, a single-logical volume may be alternatively and commonly used by a plurality of channel control units 22.

Next, a description will be given of the remote disk system 40. The remote disk system 40 is installed at a place which is remote from the local disk system 10, while the respective remote and local disk systems 40 and 10 are connected via the SAN 3 to each other. The remote disk system 40 is utilized as a data replicating destination apparatus due to a remote copy function (otherwise replication function), which has been stored in the disk device group 30 of the local disk system 10. It should be understood that the local disk system 10 and the remote disk system 40 may be so arranged that both the disk systems 10 and 40 are connected not only via the SAN 3, but also via a communication line, for example, by ATM (Asynchronous Transfer Mode), or the like. It should also be understood that in the drawings, there are some possibilities that a local disk system is abbreviated as a "local system", and a remote disk system is abbreviated as a "remote system."

As previously explained, since the remote disk system 40 is provided by a different supplier from the supplier of the local disk system 10, the sorts of the respective disk systems 0 and 40 are different from each other. As a consequence, there is a certain case in which the remote disk system 40 has a completely different structure from the structure of the local disk system 10. However, in this embodiment, for the sake of easy explanation, it is assumed that this remote disk system 40 has a similar structure to that of the local disk system 10.

The remote disk system 40 is equipped with, for example, a control apparatus 50, and a disk device group 60 which is controlled by the control apparatus 50. The control apparatus 50 may be equipped with, for instance, an MPU 51, a channel control unit 52, a connection unit 53, a disk control unit 54, a shared memory 55, and a cache memory 56. Simply speaking, the MPU 51 controls the entire arrangement of the remote disk system 40. The channel control unit 52 performs data communication via—the SAN 3.—The connection unit 53 executes connecting operations among the channel control unit 52, the disk control unit 54, the shared memory 55, and the cache memory 56. The disk control unit 54 executes a data input/output operation between its own disk control unit 54 and the disk device group 60. Various sorts of control information and the like are stored in the shared memory 55. Data and the like, which are transferred from the local disk system 10, are stored in the cache memory 56. The disk device group 60 is constituted by a plurality of disk storage devices. Sub-logical volumes corresponding to main logical volumes have been set to physical storage areas which are provided by each of the disk storage devices.

Data which has been transferred from the local disk system 10 via the SAN 3 to the remote disk system 40 when a remote copying operation is carried out is stored into the cache memory 56. The data which has been stored in the cache memory 56 is stored into the disk device group 60 after an address of this data is converted by the disk control unit 54. On the other hand, in the case where a data read request is issued from the local disk system 10, the disk control unit 54 reads out data from the disk apparatus group 60 and stores the read data into the cache memory 56. The data which has been stored in the cache memory 56 is transmitted from the channel control unit 52 via the SAN 3 to the local disk system 10.

In this storage system, the remote disk system 40 is merely capable of executing a basic data input/output function in which data transmitted from the local disk system 10 is stored, and data which is required by the local disk system 10 is transmitted. As will be discussed later, a data guarantee function for verifying whether or not data received from the local disk system 10 has been correctly stored (namely, whether or not address failure happens to occur) is mainly handled by the local disk system 10.

Next, referring to FIG. 2, the function of the cache controller 27 employed in the local disk system 10 will be explained. FIG. 2 is a block diagram of a major unit in which the cache controller 27 is mainly located, and from which the channel control unit 22, the disk control unit 24, and the like have been omitted. As will be explained later, the cache controller 27 is provided with a local disk writing unit 101, a remote disk writing unit 102, a remote disk reading unit 103, and a write judging unit 104. In the following description, there is a certain case in which a main logical volume of the local disk system 10 will be referred to as a "local disk", and a sub-logical volume of the remote disk system will be referred to as a "remote disk."

In response to a data writing request received via the channel control unit 22 from the host computer 1, the local disk writing unit 101 writes received data into the cache memory 26. After an address of the data written in the cache memory 26 is converted by the disk control unit 24, the address-converted data is stored in a predetermined area of the disk device group 30. When the data writing operation to the local disk is completed, the remote disk writing unit 102 transmits data received from the host computer 1 via the SAN 3 to the remote disk system 40 so as to store this transmitted data into the cache memory 56. After the address of the stored data in the cache memory 56 of the remote disk system 40 is converted by the disk control unit 54, the address-converted data is stored in the remote disk. When the data writing operation into the remote disk is carried out, the remote disk reading unit 103 immediately reads, via the SAN 3 and the like, the data which has just been held in the remote disk. The data read from the remote disk is inputted from the SAN 3 to the channel control unit 22 into the write judging unit 104. Also, the data which has been written in the local disk is inputted into the data judging unit 104. As a result, the write judging unit 104 compares the data written into the local disk with the data read from the remote disk just after the data has been transferred to the remote disk, and it judges whether or not both data are identical to each other. In the case where both data are identical to each other (in a case where both the contents and the logical addresses of data are coincident with each other), the write judging unit 104 judges that the data transfer operation to the remote disk has been carried out under normal conditions, and performs a data guaranteeing operation. Conversely, in the case where both data are not coincident with each other, the write judging unit 104 judges that the data transfer operation has not been carried out under normal conditions, and communicates an error message to the MPU 21. In case a normal data transfer operation has not been carried out, data is again transferred to the remote disk system 40, and a check as to whether or not the data transfer operation has been carried out under normal conditions is again performed.

It should be noted that both the data writing operation to the local disk and the data transferring operation to the remote disk may be alternatively carried out in a parallel processing mode. Alternatively, at such a time instant when data is held in the cache memory 56 of the remote disk system 40, it may be judged that a data writing operation to the remote disk has been carried out. Furthermore, an address converting process executed in the disk control unit 24 may be executed by the cache controller 27.

The flow of operations as to the above-described process will now be explained based upon a time chart of FIG. 3. First, the host computer 1 transmits a data write request to the local disk system 10 (S1). This data write request contains both data and a logical address, which designates a predetermined storage area of the local disk.

When the local disk system 10 receives the data write request via the SAN 3 and the like from the host computer 1, the local disk system 10 writes the received data via the disk control unit 24 and the like into a predetermined storage area of the local disk (S2). Also, the local disk system 10 requests a data writing operation with respect to the remote disk system 40 (S3). The remote disk system 40 stores the data received from the local disk system 10 into the cache memory 56, and it writes the data into the predetermined storage area which is designated by the logical address (S4). When the remote disk system 40 writes the data into the predetermined storage area (otherwise, at a time instant when data is held in cache memory 56), the remote disk system 40 transmits a write completion notification to the local disk system, 10 (S5).

When the local disk system 10 receives the write completion notification from the remote disk system 40, the local disk system 10 requests the remote disk system 40 to read the data which has been just written into the remote disk (S6). When the remote disk system 40 receives a data read request from the local disk system 10, the remote disk system 40 reads out the data which has been just written (S7), and then sends the read data to the local disk system 10 (S8). The local disk system 10 compares the data written in the local disk with the data read from the remote disk, and it judges whether or not both data are coincident with each other (S9). When both the data are coincident with each other, the local disk system 10 judges that the data transfer operation has been carried out under normal conditions, and then sends a write completion report with to the host computer 2 (S10). In this embodiment, both the data transfer operation from the local disk system 10 to the remote disk system 40, and the sending of the write completion report from local disk system 10 to the host computer 1 are carried out in synchronism with each other. On the other hand, in the case where the data written into the local disk is not coincident with the data read from the remote disk, the local disk system 10 judges that a normal data transfer operation has not been carried out, and the process operation is returned to the step S3 in which the local disk system 10 again transmits data to the remote disk system 40.

While this embodiment has been described in detail, even in a storage system case in which the local disk system 10 and the remote disk system 40 are mixed with each other, the suppliers of which are different from each other and the installed functions of which are different from each other, the data guarantee processing operation of the remote disk system 40 can be carried out on the side of the local disk system 10. As a consequence, even in the storage system that is under a so-called "hetero-environment", the data guarantee function can be realized and the reliability can be increased.

Also, in this embodiment, since the storage system is arranged such that the data which has been transferred to the remote disk system 40 is immediately read so as to be compared with the data held in the local disk system 10, the data guarantee processing operation of the remote disk system 40 can be realized with employment of a simple arrangement. Also, since the load processed by the local disk system 10 may become relatively small, even in a case in which there is a small spare resource in the computer resource (processing performance, memory capacity and soon) of the local disk system 10, the data guarantee processing operation of the remote disk system 40 can be carried out by the local disk system 10 instead of the remote disk system 40, so that the reliability of the storage system can be increased.

In accordance with another aspect, the data guarantee processing operation corresponding to one sort of the support functions related to the data input/output operations is carried out by the local disk system 10 having a high function, instead of by the remote disk system 40 having a low function. As a result, the computer resources of the respective storage device systems which constitute the storage system can be effectively utilized, so that the reliability of the entire storage system can be increased.

[Embodiment 2]

Next, a second embodiment of the present invention will be explained with reference to FIG. 4 to FIG. 7. This embodiment is featured by the fact that a guarantee code is produced based upon data received from a host computer 1, the guarantee code is managed on the side of a local disk system, and only the data is transferred to the side of a remote disk system.

Figure 4:
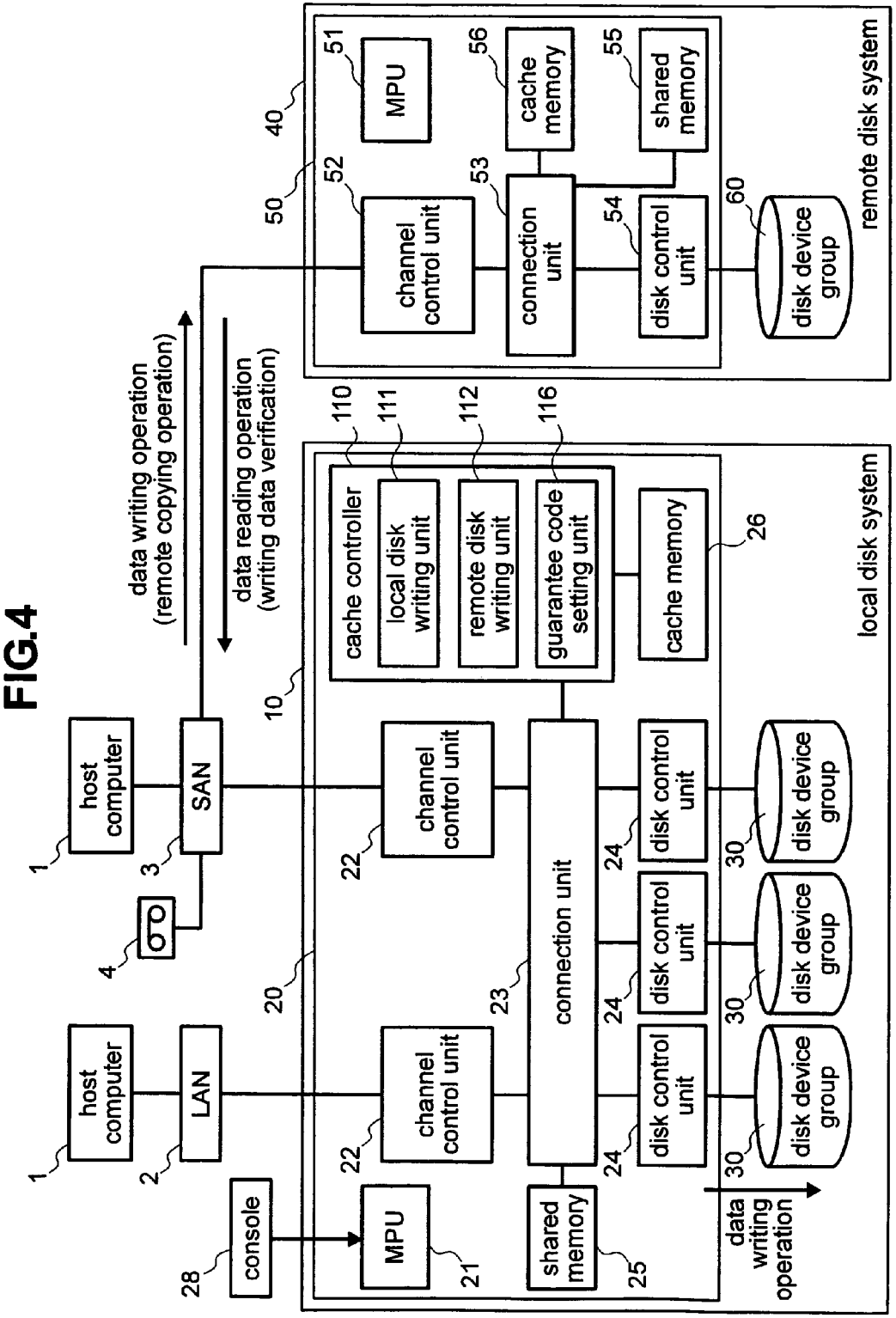
FIG. 4 is a block diagram illustrating the overall arrangement of a storage system according to a second embodiment of the present invention.
Figure 5:
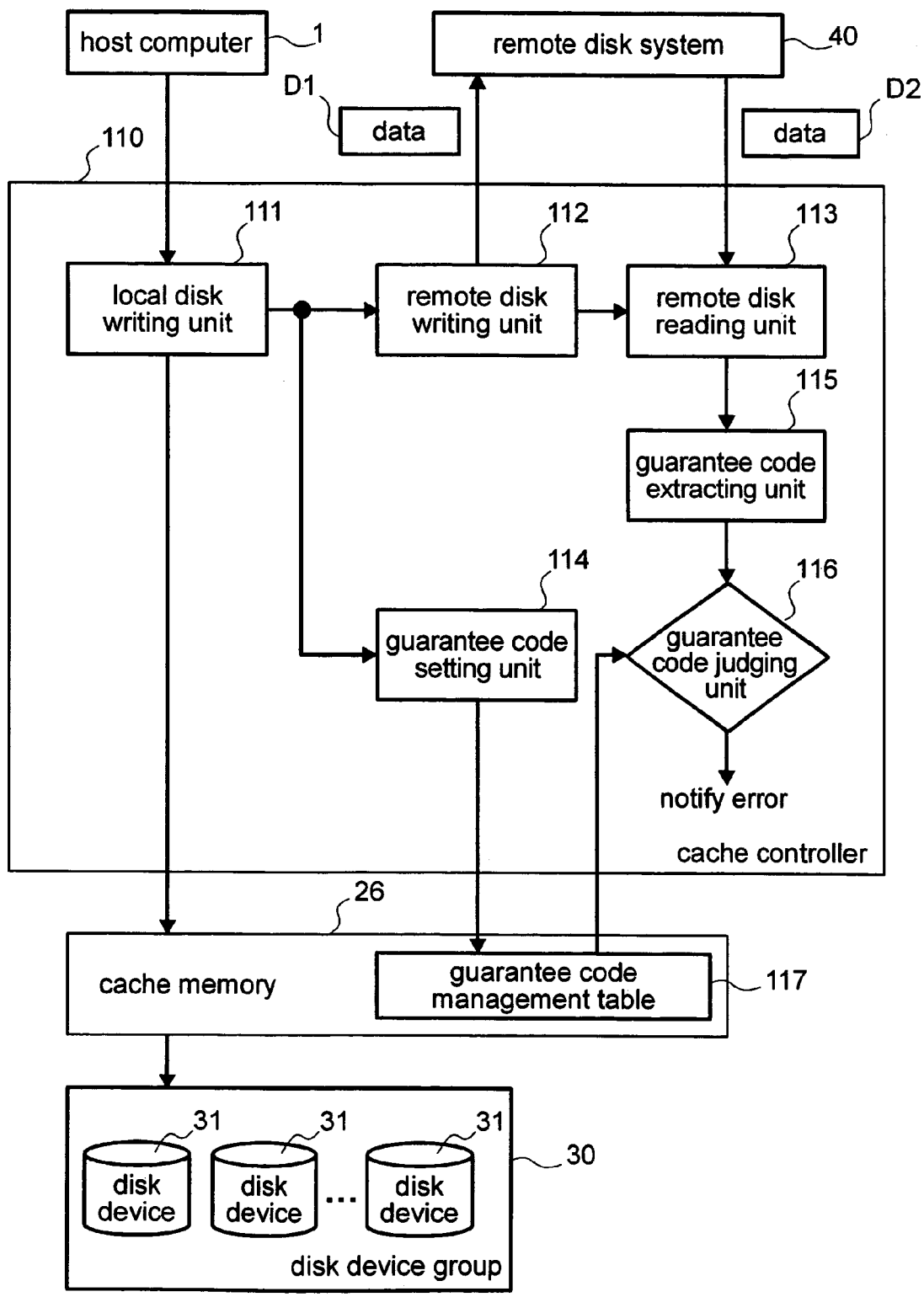
FIG. 5 is a block diagram showing a major unit of a local disk system.

As shown in a diagram of the overall system of FIG. 4 and also shown in a block diagram of a major unit thereof in FIG. 5, this embodiment is different from the above-explained embodiment as to the technical point that, in the local disk system 10, a cache controller 110 is equipped with a guarantee code setting unit 116. FIG. 5 is a block diagram showing a major unit in which the cache controller 110 is mainly employed. The cache controller 110 may be arranged by employing, for example, a local disk writing unit 111, a remote disk writing unit 112, a remote disk reading unit 113, a guarantee code setting unit 114, a guarantee code extracting unit 115, and a guarantee code judging unit 116.

In response to a data writing request issued from the host computer 1, the local disk writing unit 111 stores received data into the cache memory 26. The data stored in the cache memory 26 is stored into a local disk by the disk control unit 24. The remote disk writing unit 112 transmits the data received from the host computer 1 via the SAN 3 to the remote disk system 40, and then stores the transmitted data into the cache memory 56 provided on the remote side. In response to a data reading request, the remote disk reading unit 113 reads data from a remote disk.

The guarantee code setting unit 114 produces a guarantee code based upon data received from the host computer 1, and it sets the produced guarantee code in relation to the received data. A guarantee code is produced based upon an attribute of the data received from the host computer 1. In other words, a guarantee code may be produced based upon a logical address and error correcting information (LRC etc.), for received data which is to be stored at this logical address. The produced guarantee code is stored into a guarantee code management table 117 formed within the cache memory 26 in correspondence with the received data.

The guarantee code extracting unit 115 extracts (produces) a guarantee code based upon data read out from the remote disk reading unit 113. In other words, the guarantee code extracting unit 115 produces a guarantee code based upon an attribute of the data read out from a remote disk reading unit in accordance with the same method as that of the guarantee code setting unit 114. It should be noted that data which is stored into the remote disk reading unit corresponds to a copy of the data which is stored into the local disk. As a consequence, in the case where a remote copying operation is carried out under normal conditions, a local-side guarantee code (original guarantee code) which is produced based upon an attribute of data to be stored into the local disk is identical to a remote-side guarantee code which is produced based upon an attribute of data to be stored into the remote disk reading unit. As a consequence, the guarantee code judging unit 116 compares a remote-side guarantee code entered from the guarantee code extracting unit 115 with a local-side guarantee code read from the guarantee code management table 117, and thus judges whether or not the remote-side guarantee code is coincident with the local-side guarantee code. In such a case that the remote-side guarantee code is coincident with the local-side guarantee code, the guarantee code judging unit 116 judges that the data transfer operation (remote copying operation) has been carried out under normal conditions, and thus it can guarantee that the data can be read out from the remote disk reading unit under normal conditions. On the other hand, in case both the remote-side guarantee code and the local-side guarantee code are not coincident with each other, since a failure happens to occur in the data read from the remote disk reading unit, the guarantee code judging unit 116 sends an error message to the MPU 21.

Figure 6:
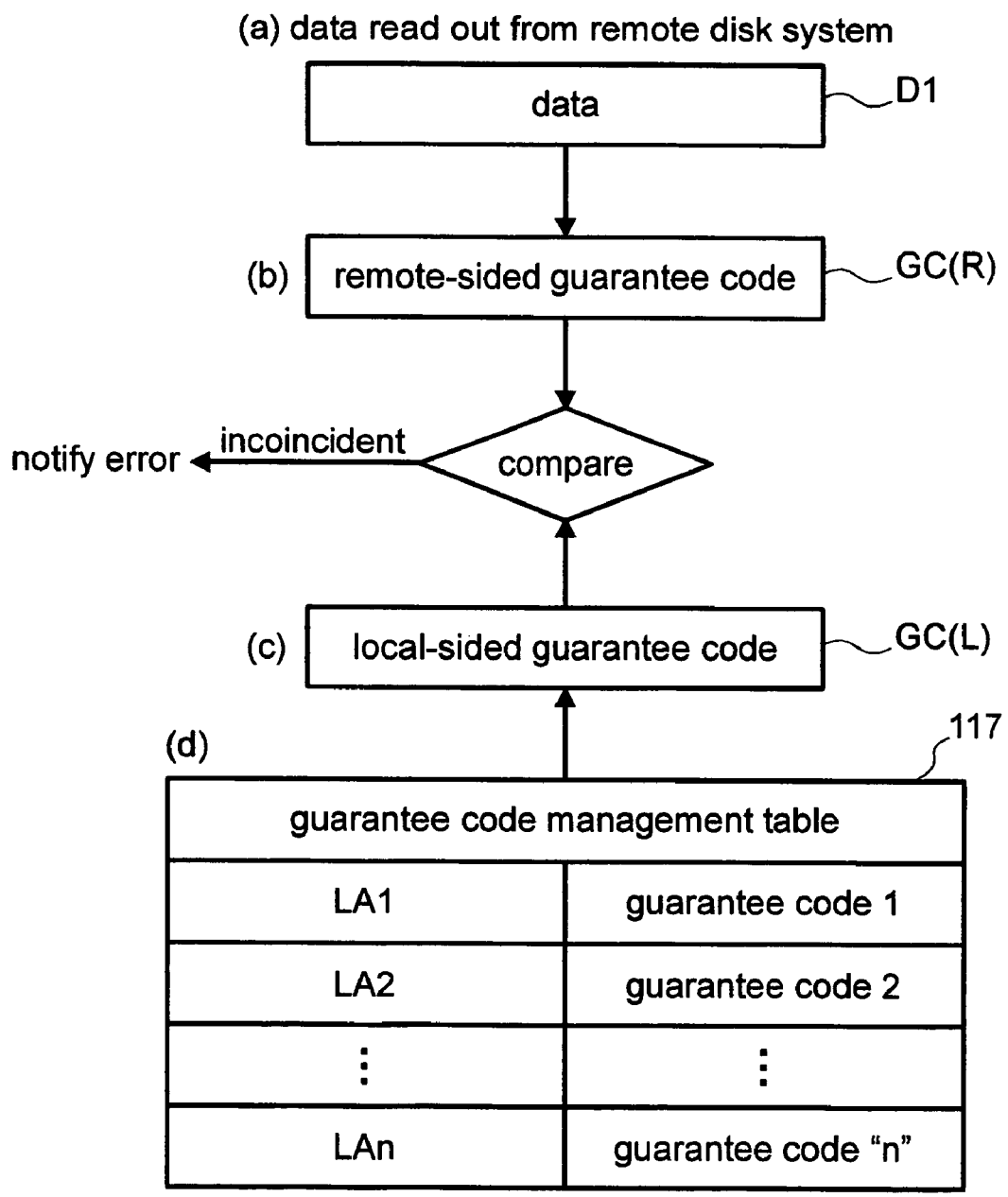
FIG. 6 is a diagram schematically showing a condition of a judging operation based upon a guarantee code.

FIG. 6 is a schematic diagram for showing a condition in which a remote-side guarantee code (GC(R)) is compared with a local-side guarantee code (GC(L)). As shown in FIG. 6 at (a), data "D1" read from the remote disk is not provided with a guarantee code. In other words, the guarantee code is not managed in the remote disk system 40. As represented in FIG. 6 at (b), the guarantee code extracting unit 115 produces a remote-side guarantee code (GC(R)) based upon the data "D1" read from the remote disk. On the other hand, as shown in FIG. 6 at (d), in the guarantee code management table 117, logical addresses "LA" and guarantee codes have been stored in correspondence thereto for every data received from the host computer 1. As indicated in FIG. 6 at (c), in the case where certain data is read out from the remote disk, the guarantee code judging unit 116 retrieves the guarantee code management table 117 while a logical address of such a data to be read is used as a retrieve key so as to read out the relevant guarantee code (GC(L)). The guarantee code judging unit 116 compares the remote-side guarantee code (GC(R)) with the local-side guarantee code (GC(L)), which have been acquired in this manner. Then, when both the remote-side/local-side guarantee codes are coincident with each other, the guarantee code judging unit 116 can guarantee the data; whereas, when both the remote-side/local-side guarantee codes are not coincident with each other, the guarantee code judging unit 116 issues an error notification. The present invention is not limited only to the above-explained respective process operations wherein the producing operation and the comparing operation of the guarantee codes are executed within the cache controller 110. For instance, these process operations may be alternatively executed by the MPU 21 by way of an interrupt process operation. Alternatively, setting of a guarantee code may be carried out in the disk control unit 24, producing of a remote-side guarantee code may be carried out by the channel control unit 22, and the comparing of both the guarantee codes may be executed by the MPU 21. Furthermore, the invention is not limited only to a case in which the guarantee code management table 117 is provided in the cache memory 26. Alternatively, for example, a disk which is exclusively used for guarantee codes may be provided to hold the guarantee code management table 117.

Figure 7:
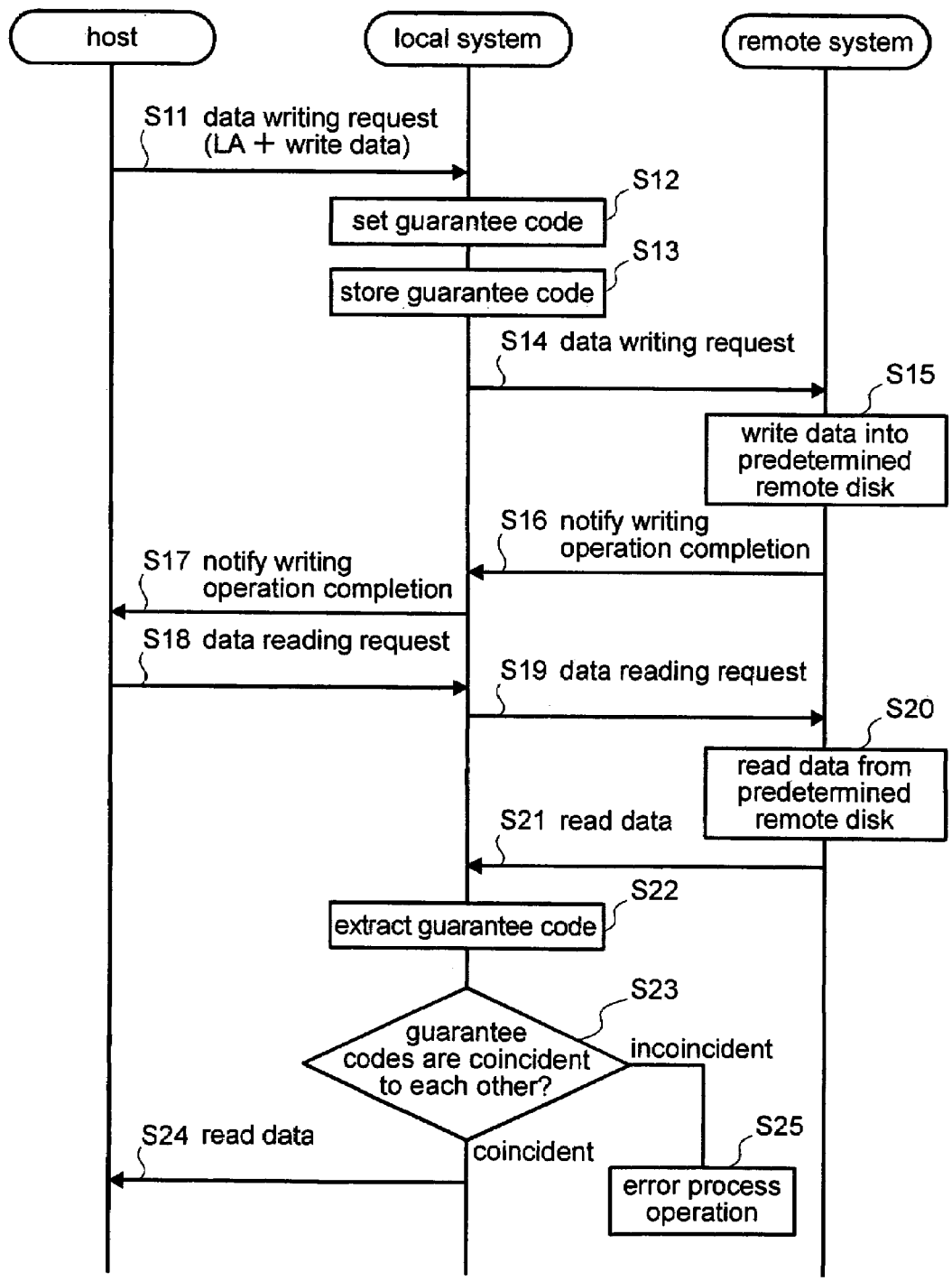
FIG. 7 is a time chart illustrating the overall operation of the storage system.

The flow of operations of the above-described process will now be described based upon a time chart of FIG. 7. First, the host computer 1 transmits a data writing request to the local disk system 10 via the SAN 3 (S11). This data writing request contains both data to be written and a position (logical address) at which the data should be written. The local disk system 10 produces a guarantee code based upon the data writing request issued from the host computer 1 (S12), and then it registers the produced guarantee code into the guarantee code management table 117 (S13).

Next, in response to the data writing request received from the host computer 1, the local disk system 10 requests a data writing operation with respect to the remote disk system 40 (S14). This data writing request contains both the data to be written and the logical address at which the data should be written, but does not contain the guarantee code produced in step S12. The remote disk system 40 stores the data received via the SAN 3 from the local disk system 10 into the cache memory 56, and stores the data which has been stored in the cache memory 56 at a predetermined position of the disk device group 60 (S15). Then, the remote disk system 40 sends a notification that the data storing operation at the designated logical address has been accomplished to the local disk system 10 (S16). When the local disk system 10 receives the writing operation completion notification from the remote disk system 40, the local disk system 10 reports that the data writing operation has been completed to the host computer 1 (S17). As a consequence, in this embodiment, the data transfer operation to the remote disk system 40 is carried out in synchronism with the write completion notifying operation to the host computer 1.

In a case in which the host computer 1 reads predetermined data from the remote disk and utilizes the read data, the host computer 1 transmits a data reading request to the local disk system 10 (S18). The local disk system 10 requests the remote disk system 40 to read the data in response to the data reading request sent from the host computer 1 (S19). In response to the data reading request issued from the local disk system 10, the remote disk system 40 reads out data stored at a predetermined logical address of the remote disk (S20), and then, it transmits the read data to the local disk system 10 (S21).

When the local disk system 10 receives the data from the remote disk system 40, the local disk system 10 produces a remote-side guarantee code based upon this received data (S22). The local disk system 10 compares the local-side guarantee code which has been stored in the guarantee code management table 117 in S13 with the remote-side guarantee code produced in the S22 (S23). Then, in case the local-side guarantee code is coincident with the remote-side guarantee code, the local disk system 10 judges that the data read from the remote disk system 40 is normal data, and it then transmits this read data via the SAN 3 to the host computer 1 (S24). On the other hand, in a case in which the remote-side guarantee code is not coincident with the local-side guarantee code, the local disk system 10 executes an error processing operation (S25). As the error processing operation, for instance, a process operation may be carried out in which the normal data stored in the local disk is again copied to the remote disk.

Even in the storage system of this embodiment with employment of the above-described arrangement, since the data guarantee process operation by the remote disk system 40 is carried out by the local disk system 10, a similar effect to that of the above-explained embodiment can be achieved. In addition thereto, in this embodiment, since the storage system is arranged in such a manner that the guarantee code which originated from the data is produced and the local-side guarantee code is compared with the remote-side guarantee code, the data guarantee process operation can be carried out with a higher reliability. Also, the guarantee code is produced and managed on the side of the local disk system 10, and the local disk system 40 manages only the data, so that none of the functions provided on the side of the remote disk system 40 need be completely changed, and the reliability of the storage system can be relatively readily improved.

[Embodiment 3]

Next, a third embodiment of the present invention will be explained with reference to FIG. 8 to FIG. 10. This embodiment is featured by the fact that a guarantee code and data are combined with each other in an integral form, and the guarantee code is also held even on the side of a remote disk system 40.

Figure 8:
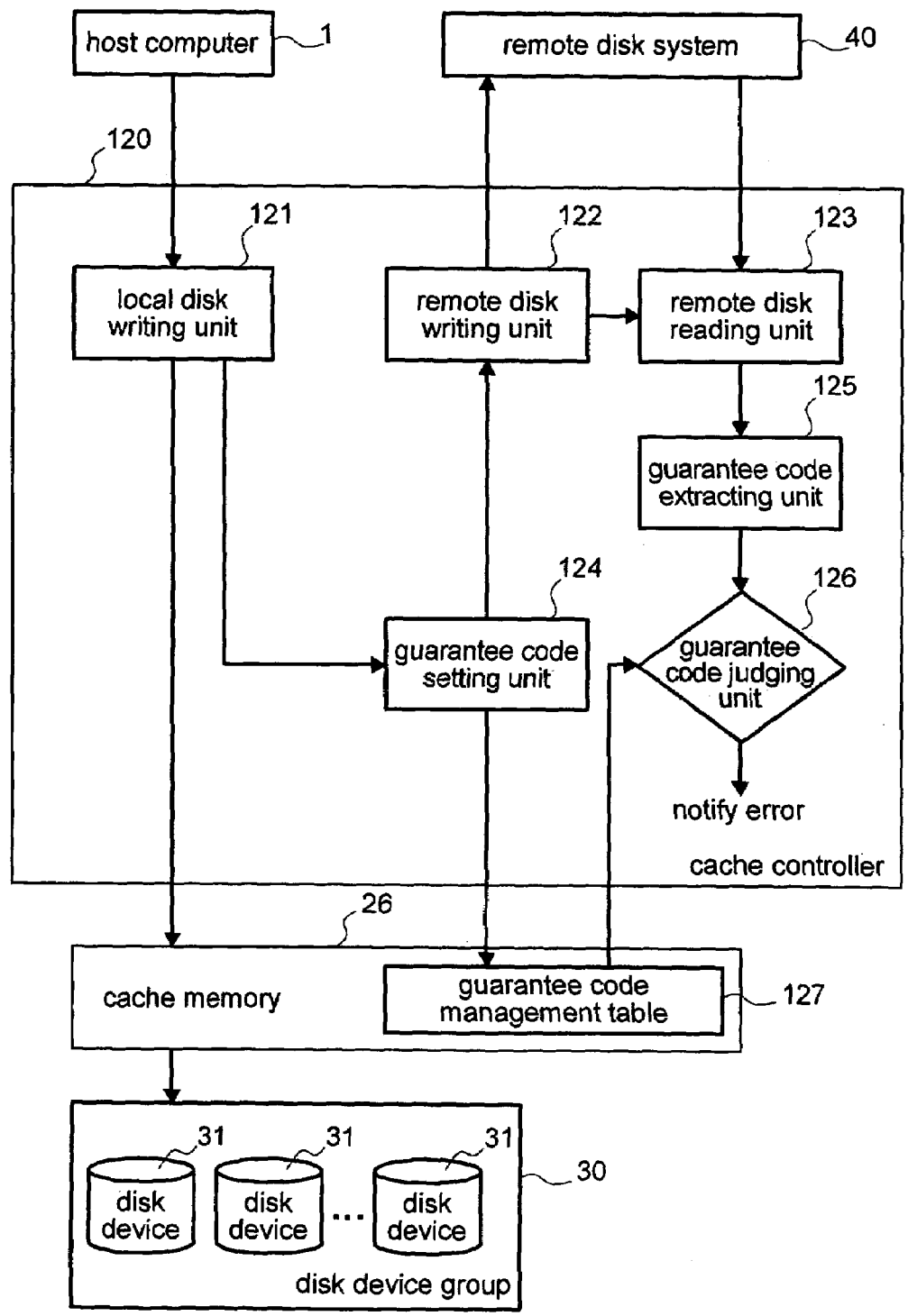
FIG. 8 is a block diagram illustrating the overall arrangement of a storage system according to a third embodiment of the present invention.

FIG. 8 is a block diagram showing a major unit in which a cache controller 120 of a local disk system 10 is mainly employed. Similar to the above-explained embodiment, both the channel control unit 22 and the disk control unit 24 are omitted from this drawing. The cache controller 120 is provided with a local disk writing unit 121, a remote disk writing unit 122, a remote disk reading unit 123, a guarantee code setting unit 124, a guarantee code extracting unit 125, and a guarantee code judging unit 126.

In response to a data writing request issued from the host computer 1, the local disk writing unit 121 stores received data into the cache memory 26, and it stores data from the cache memory 26 via the disk control unit 24 into a predetermined area of a disk device group 30. The remote disk writing unit 122 is employed so as to copy data on a remote disk of the remote disk system 40 based upon a data writing request issued from the host computer 1. The remote disk reading unit 123 is employed so as to read such a data which has been stored at a predetermined logical address of the remote disk. The guarantee code setting unit 124 produces a guarantee code based upon data received from the host computer 1. Similar to the above embodiment, the guarantee code corresponds to unique information that is capable of exclusively specifying received data, and it is produced based upon an attribute of the received data.

The guarantee code produced by the guarantee code setting means 124 is registered in the guarantee code management table 127 so as to be managed. Also, the guarantee code is entered from the guarantee code setting means 124 to the remote disk writing unit 122. The remote disk writing unit 122 causes the guarantee code to be related to the data received from the host computer 1 so that the received data is combined with the guarantee code in an integral form to produce "data with an attached guarantee code" which is transmitted to the remote disk system 40. The remote disk system 40 recognizes the entire data with the attached guarantee code, which has been encapsulated, as data which should be written into the remote disk, and then holds this encapsulated data with the attached guarantee code.

The guarantee code extracting unit 125 extracts only the guarantee code based upon the data with the attached guarantee code which is read out from the remote disk by the remote disk reading unit 123. The guarantee code judging unit 126 compares the local-side guarantee code which is managed in the guarantee code management table 127 with the guarantee code which is extracted from the data with the attached guarantee code received from the guarantee code extracting unit 125. In a case in which the local-side guarantee code is coincident with the extracted guarantee code, the guarantee code judging unit 126 can guarantee that the correct data is read out from the remote disk. On the other hand, in the case, where the local-side guarantee code is not coincident with the extracted guarantee code, the guarantee code judging unit 126 sends an error message to the MPU 21.

Figure 9:
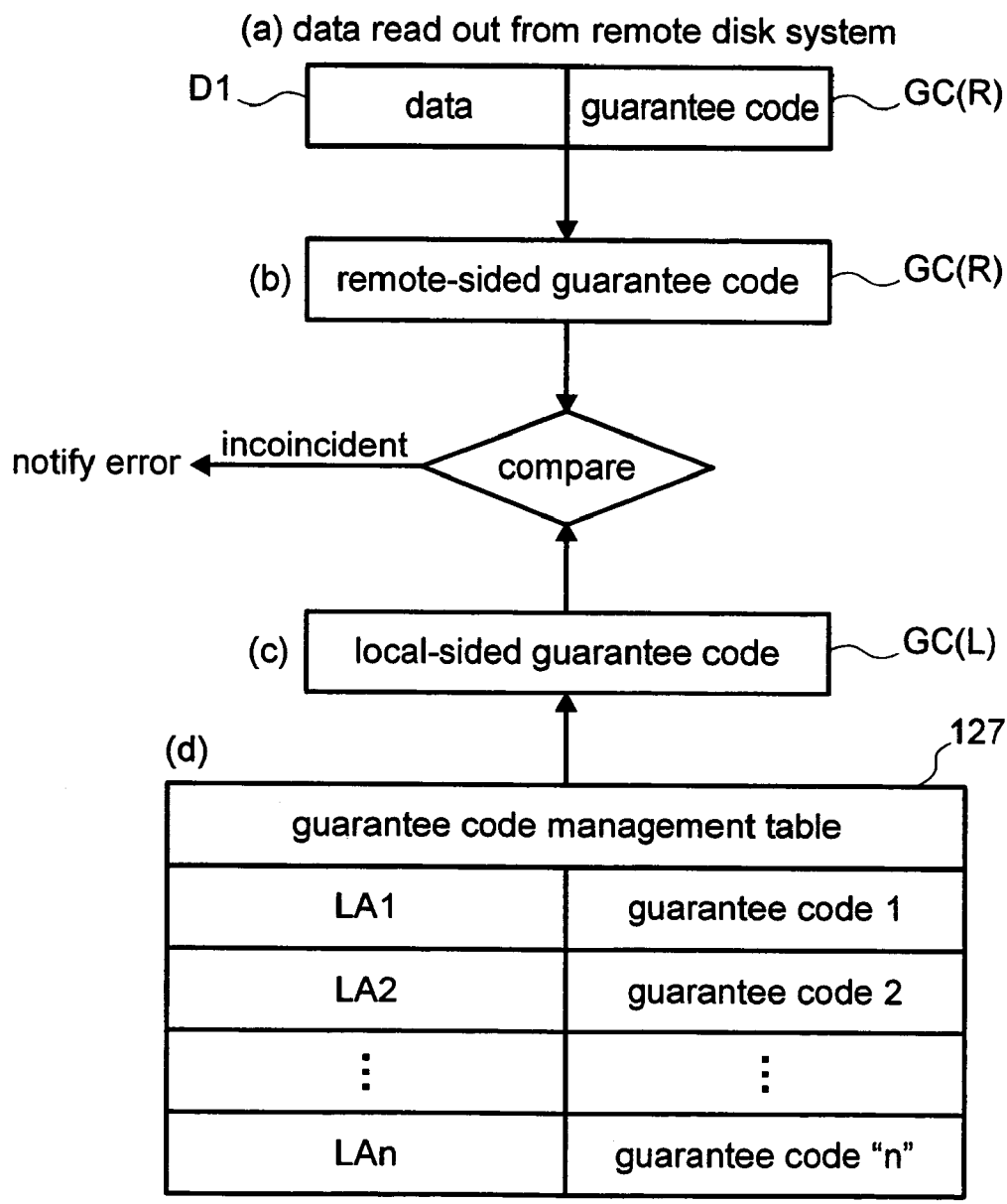
FIG. 9 is a diagram schematically showing a condition of judging operations based upon a guarantee code.
Figure 10:
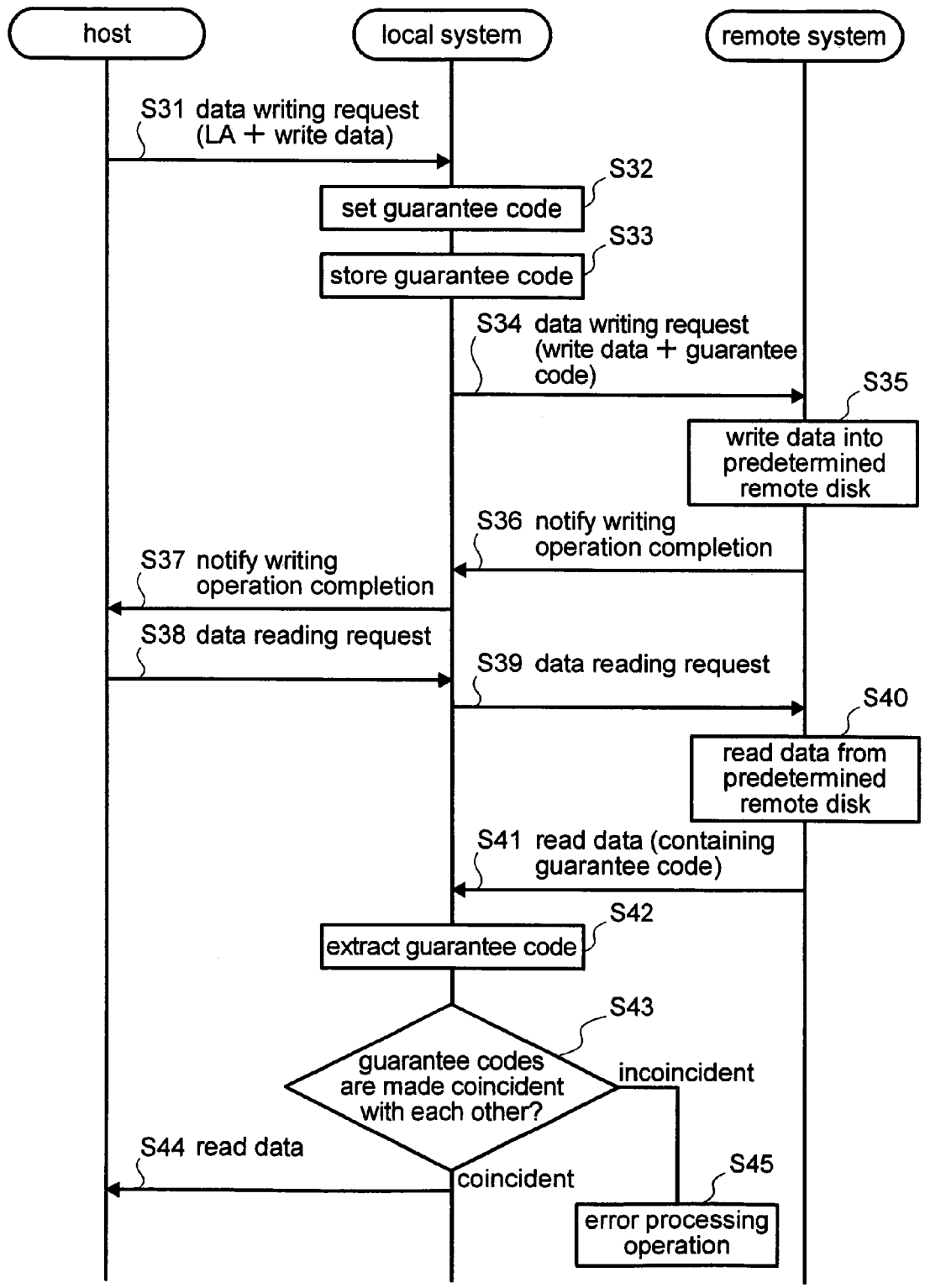
FIG. 10 is a time chart illustrating the overall operation of the storage system.

As indicated in FIG. 9 at (a), data with an attached guarantee code, in which a guarantee code "GC(R))" has been related to data "D1" so as to be combined therewith in an integral form, has been stored in a remote disk. Since both the received data and the guarantee code have been combined with each other in an integral form in the data with the attached guarantee code, the data length of this data becomes longer than the data length of the original received data. For example, in a case in which the data length of the received data corresponds to 512 bits and the guarantee code corresponding to 8 bits, the data with the attached guarantee code has a data length of 520 bits at a minimum. The guarantee code extracting unit 125 separates the remote-side guarantee code GC(R) from the data so as to extract the remote-side guarantee code GC(R). On the other hand, the guarantee code judging unit 126 reads a local-side guarantee code "GC(L)" from the guarantee code management table 127 based upon a designated local address. The guarantee code judging unit 126 executes the data guarantee operation instead of the remote disk system 40 by comparing the local-side guarantee code GC(L) with the remote-side guarantee code GC(R).

A description will be given of a flow of operations of the process with reference to the time chart of FIG. 10. First, the host computer 1 transmits a data writing request to the local disk system 10 (S31). In response to the data writing request, the local disk system 10 produces a guarantee code (S32), and then stores the produced guarantee code into the guarantee code management table 127 in relation to the received data (S33). Next, the local disk system 10 requests a data writing operation with respect to the remote disk system 40 (S34). As previously explained, in this case, the data which is transmitted from the local disk system 10 to the remote disk system 40 corresponds to data with the attached guarantee code such that the data received from the host computer 1 is related to the guarantee code produced based upon this received data and this received data, is combined with the produced guarantee code in an integral form.

When the remote disk system 40 receives the data with the attached guarantee code, the remote disk system 40 holds this entire data as "received data", and stores this received data from the cache memory 56 via the disk control unit 54 to the disk device group 60 (S35). In this case, as explained above, the data size of the data with the attached guarantee code is increased by the data size of the guarantee code which is added on an integral manner. As a result, the effective storage capacity of the data which can be stored in the remote disk system 40 is lowered. Also, it is conceivable that there are many cases in which the format of the remote-side disk device group 60 is not coincident with the data size of the data with the attached guarantee code. As a result, the data with the attached guarantee code is stored in a new disk. When the remote disk system 40 stores thereinto the data with the attached guarantee code, the remote disk system 40 sends a writing operation completion report to the local disk system 10 (S36). Upon receipt of the writing operation completion report, the local disk system 10 sends the data writing operation completion report to the host computer 1 (S37). As a consequence, both the reporting of the writing operation completion to the host computer 1 and the remote copying operation are carried out in a synchronous mode.

Next, when the host computer 1 requests to read predetermined data by designating a logical address with respect to the local disk system 10 (S38), the local disk system 10 requests to read the data with respect to the remote disk system 40 (S39). As a result, the remote disk system 40 reads the data (data with attached guarantee code) at the designated logical address (S40), and transmits the data with the attached guarantee code to the local disk system 10 (S41). The local disk system 10 receives the data with the attached guarantee code from the remote disk system 40, and extracts the guarantee code from this received data (S42). Then, the local disk system 10 compares the local-side guarantee code which has been registered in the guarantee code management table 127 with the remote-side guarantee code which has been separated/extracted from the data with the attached guarantee code (S43). Then, in a case in which the local-side guarantee code is coincident with the remote-side guarantee code, the local disk system 10 guarantees that the data has been read under normal conditions instead of the remote disk system 40, and it transmits the data read from the remote disk to the host computer 1 (S44). On the other hand, in the case where the local-side guarantee code is not coincident with the remote-side guarantee code, the local disk system 10 executes an error process operation (S45). As the error process operation, for example, a remote copying operation is again carried out.

Even in the storage system with employment of the above-explained arrangement of this embodiment, since the data guarantee processing operation of the remote disk system 40 can be carried out on the side of the local disk system 10, a similar effect to that of the above-described embodiment can be achieved. In addition thereto, in this embodiment, since not only the data, but also the guarantee code, are stored in the remote disk, the data can be guaranteed with a higher reliability.

[Embodiment 4]

Next, a fourth embodiment of the present invention will be described with reference to FIG. 11. This fourth embodiment is featured by the fact that data guarantee modes on the side of the remote disk system 40, which are processed on the side of the local disk system 10, instead of the remote disk system 40, can be selected.

Figure 11:
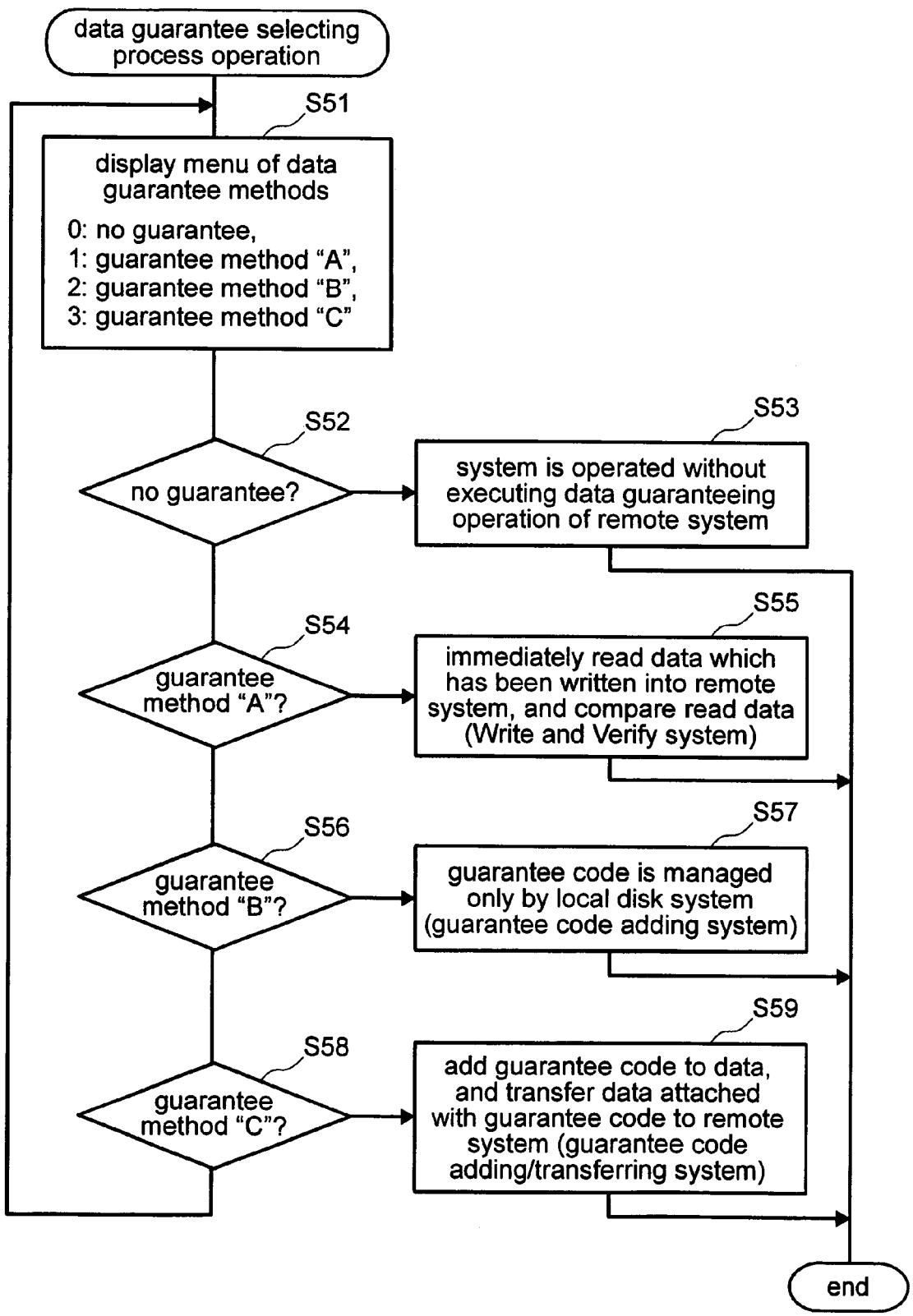
FIG. 11 is a flow chart showing a selecting process operation of a data guarantee mode according to a fourth embodiment of the present invention.

FIG. 11 shows a process for selecting the data guarantee modes. First, in the case in which a data guarantee mode is set, or changed, a user selects a desirable data guarantee mode based upon a menu displayed on a screen of the console 28 (S51). In this embodiment, four sorts of guarantee modes have been previously prepared. That is to say, the following four sorts of guarantee modes are prepared: a mode in which a data guarantee operation is not carried out (no guarantee mode); a first guarantee mode A in which data written in the remote disk is immediately read so as to be compared; a second guarantee mode B in which a guarantee code is managed only by the local disk system 10; and a third guarantee mode C in which data with an attached guarantee code is stored in the remote disk.

In the case in which a plurality of remote disk systems are connected to the local disk system 10, the user can select data guarantee modes respectively with respect to each of the plural remote disk systems. Also, data guarantee modes which are different from each other for each of the logical volumes may be alternatively selected.

In the case that the no guarantee mode is selected (S52), the local disk system 10 does not execute the data guarantee operation on the side of the remote disk system 40 (S53). In the case in which the first data guarantee mode is selected (S54), as previously described in connection with the first embodiment, the local disk system 10 immediately reads data written in the remote disk (otherwise, cache memory 56) and compares this read data with data held in the local disk (otherwise, cache memory 26), so that a data guaranteeing operation on the side of the remote disk system 40 can be realized by the local disk system 10 instead of the remote disk system 40 (S55).

When the second data guarantee mode is selected (S56), as described in connection with the second embodiment, the local disk system 10 performs a data guaranteeing operation instead of the remote disk system 40 in such a way that a guarantee code is produced based upon data received from the host computer 1, and the produced guarantee code is managed only by the local disk system 10 (S57). In the case in which the third data guaranteeing mode is selected (S58), as described in connection with the third embodiment, the local disk system 10 executes a data guarantee operation instead of the remote disk system 40 by which data with an attached guarantee code is stored in the remote disk (S59).

As previously explained, in this embodiment, any one or a plurality of data guarantee modes can be selected from a plurality of data guarantee modes which have been previously prepared. As a consequence, a proper data guarantee mode can be selected by considering the processing capability and the installed memory capacity of the local disk system 10, or by considering the structure of the remote disk system 40 and the operating method of the entire storage system. As a result, the reliability of the storage system under a hetero-environment can be increased by employing a simple structure, and the storage system can be operated in a more flexible and pliable manner, so that the user operability of the storage system can be improved.

[Embodiment 5]

Figure 12:
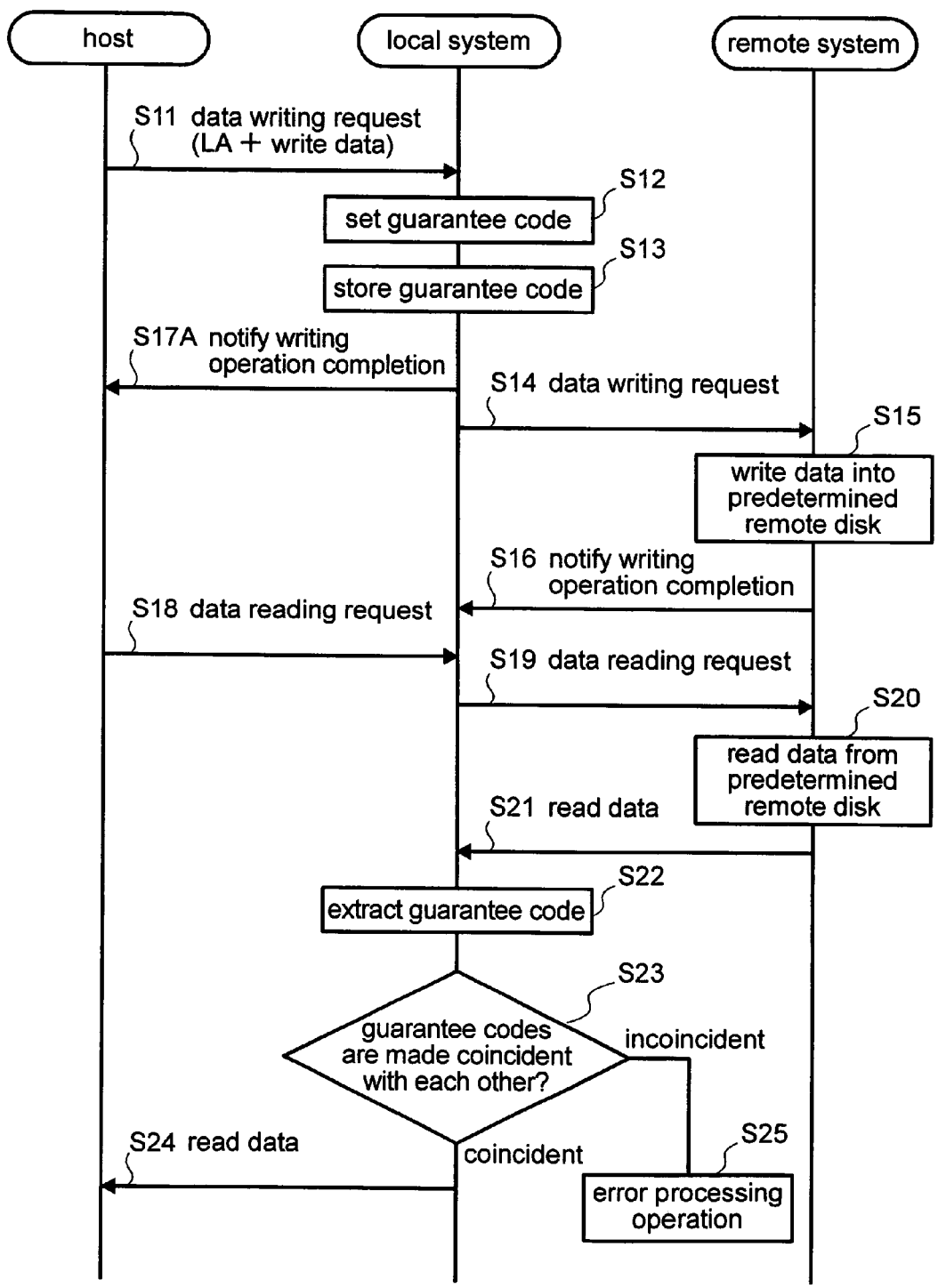
FIG. 12 is a time chart showing the overall operation of a storage system according to a fifth embodiment of the present invention.

FIG. 12 is a time chart showing the overall operation of a storage system according to a fifth embodiment of the present invention. In this embodiment, an asynchronous process is carried out. In other words, when the local disk system 10 receives a data writing request from the host computer 1 (S11), the local disk system 10 stores the received, data into the local disk and also produces a guarantee code (S12), and then, it registers the produced guarantee code into the guarantee code management table 127 (S13). Then, the local disk system 10 sends a writing operation completion report to the host computer 1 before the local disk system 10 copies the data to the remote disk (S17A). In FIG. 12, the local disk system 10 sends the writing operation completion report to the host computer 1 just after the guarantee code has been stored. Alternatively, the local disk system 10 may transmit the writing operation completion report to the host computer 1 at another different timing. Also, even in the time chart of FIG. 10, similar to FIG. 12, the asynchronous processing operation may be carried out.

It should be noted that the present invention-is not limited only to the above-described respective embodiments. Various changes and various additions may be readily made within the technical scope of the present invention by one skilled in the art.

What is claimed is:

1. A storage system employed in a hetero-environment in which a main storage system is connected to a sub-storage system, the sort of which is different from the sort of said main storage system, for transmitting/receiving data between an upper grade apparatus and said storage system, wherein said main storage system comprises:

receiving means for receiving data and a data writing request from said upper grade apparatus;

data holding means for holding the data, which is required to be written in response to said received data writing request;

transferring means for transferring to the sub-storage system, a copy of the data which is required to be written, in response to said received data writing request; and data guaranteeing means for guaranteeing whether or not said data copied to and held in said sub-storage system corresponds to correct data;

wherein in said hetero-environment, said main storage system and said sub-storage system connected thereto respectively employ different guarantee functions to guarantee the correct transfer of data during data transfer operations;

wherein the data guaranteeing means is arranged to receive, from the sub-storage system, the data copied to the sub-storage system and read out therefrom, and to store the data received from the sub-storage system at least until the guarantee; and also to receive, from the data holding means, the data held in the data holding means; and, wherein according to the guarantee function employed by the main storage, the data guaranteeing means compares the data received from the sub-storage system with the data received from the data holding means, judges whether the data received from the sub-storage system is identical to the data received from the data holding means, and if the data are not identical to each other, outputs an error notification, in response to which the transferring means again transfers the copy of the data to said sub-storage system.

2. A storage system as claimed in claim 1, wherein said sub-storage system is not provided with a data guarantee function which can be utilized from said main storage system.

3. A storage system as claimed in claim 1, wherein said data guaranteeing means comprises:

guarantee code producing means for producing a guarantee code based upon data which is required to be written in the case in which said receiving means receives said data writing request;

guarantee code holding means for holding said produced guarantee code;

extracting means for extracting a guarantee code based upon the data read out from said sub-storage system; and comparing means for performing a data guaranteeing operation by comparing the guarantee code held by said guarantee code holding means with the guarantee code extracted by said extracting means.

4. A storage system as claimed in claim 1, wherein said data guaranteeing means comprises:

guarantee code producing means for producing a guarantee code based upon the data which is required to be written in the case in which said receiving means receives said data writing request;

guarantee code holding means for holding said produced guarantee code;

data-attached-with-guarantee code transferring means operated in such a manner that, while both said produced guarantee code and said data which is required to be written are related to each other as data with an attached guarantee code, the data with the attached guarantee code is transferred to said sub-storage system by said transferring means;

extracting means for extracting the guarantee code from said data with the attached guarantee code read out from said sub-storage system; and comparing means for executing a data guarantee operation by comparing the guarantee code held by said guarantee code holding means with the guarantee code extracted by said extracting means.

5. A storage system as claimed in claim 4, wherein said data with the attached guarantee code is constituted In such a manner that said data with the attached guarantee code is recognized as said data which is required to be written by said sub-storage system.

6. A storage system as claimed in claim 1 wherein said storage system comprises data guarantee selecting means for controlling the operation of said data guaranteeing means.

7. A storage system as claimed in claim 6, wherein said data guaranteeing means is provided with a plurality of data guarantee modes, and said data guarantee selecting means selects at least any one of said plural data guarantee modes.

8. A storage system as claimed in claim 7, wherein said data guaranteeing means is provided with at least two or more guarantee modes among:
  (1) a first guarantee mode for executing a data guaranteeing operation in such a manner that the data which is required to be written is transferred to said sub-storage system so as to be held therein, said data held in said sub-storage system is read out, and said read data is compared with the data held in said main storage system;
  (2) a second guarantee mode for performing a data guaranteeing operation in such a manner that a guarantee code produced based upon said data which is required to be written is held in said main storage system, and a guarantee code extracted from the data read out from said sub-storage system is compared with the guarantee code held in said main storage system; and
  (3) a third guarantee mode for executing a data guaranteeing operation in such a manner that the guarantee code produced based upon the data which is required to be written is held in said main storage system, data with an attached guarantee code, which is constituted by relating said guarantee code to said data, is transferred to said sub-storage system so as to be held therein, and the guarantee code which is extracted from said data with the attached guarantee code read out from said sub-storage system is compared with the guarantee code held in said main storage system.

9. A storage system as claimed in claim 1, wherein said data guaranteeing means is provided with at least two or more guarantee modes among:
  (1) a first guarantee mode for executing a data guaranteeing operation in such a manner that the data which is required to be written is transferred to said sub-storage system so as to be held therein, said data held in said sub-storage system is read out, and said read data is compared with the data held in said main storage system;
  (2) a second guarantee mode for performing a data guaranteeing operation in such a manner that a guarantee code produced based upon said data which is required to be written is held in said main storage system, and a guarantee code extracted from the data read out from said sub-storage system is compared with the guarantee code held in said main storage system; and
  (3) a third guarantee mode for executing a data guaranteeing operation in such a manner that the guarantee code produced based upon the data which is required to be written is held in said main storage system, data with an attached guarantee code, which is constituted by relating said guarantee code to said data, is transferred to said sub-storage system so as to be held therein, and the guarantee code which is extracted from said data with the attached guarantee code read out from said sub-storage system is compared with the guarantee code held in said main storage system.

10. A storage system as claimed in claim 9, further comprising input/output selecting means by which a user selects among the first, second, and third guarantee modes.

11. A storage system as claimed in claim 1, further comprising input/output selecting means by which a user selects one of the following data guarantee modes provided for said data guaranteeing means:
  (1) a first guarantee mode for executing a data guaranteeing operation in such a manner that the data which is required to be written is transferred to said sub-storage system so as to be held therein, said data held in said sub-storage system is read out, and said read data is compared with the data held in said main storage system; and
  (2) a second guarantee mode for performing a data guaranteeing operation in such a manner that a guarantee code produced based upon said data which is required to be written is held in said main storage system, and a guarantee code extracted from the data read out from said sub-storage system is compared with the guarantee code held in said main storage system.

12. A storage system employed in a hetero-environment in which a plurality of different sorts of storage device systems are mixed with each other, and support functions thereof related to data input/output operations are different from each other, wherein:
  a storage device system having a high function among said plurality of different sorts of storage device systems, executes a predetermined support function for a storage device system having a low function among said plurality of different sorts of storage device systems instead of said storage device system having the low function;
  wherein in said hetero-environment, the storage device system having the high function and the storage device system having the low function respectively employ different guarantee functions to guarantee correct input/output of data during data input/output operations;
  wherein the storage device system having the high function stores a copy of data transferred in a data input/output operation from the storage device system having the high function to the storage device system having the low function; and, receives, from the storage device system having the low function, the data copied to the storage device system having the low function and stores the data received from the storage device system having the low function; and according to the guarantee function employed by the storage device system having the high function, compares the data received from the storage device system having the low function with the data transferred in the data input/output operation and stored therein; judges whether the data received from the storage device system having the low function is identical to the data transferred in the data input/output operation and stored therein; and if the data are not identical to each other, outputs an error notification, in response to which the copy of the data is again transferred to the storage device system having the low function.

13. A storage system as claimed in claim 12, wherein said storage device system having the high function comprises:
  judging means for judging as to whether or not a predetermined event for executing said predetermined support function happens to occur; and substituting process means operated in such a manner that in the case in which said judging means judges that said predetermined event happens to occur, said predetermined support function is executed by said storage device system having the high function instead of said storage device having the low function.

14. A storage system as claimed in claim 13, wherein said substituting process means executes said predetermined support function by way of either a synchronous processing operation or an asynchronous processing operation.

15. A storage system as claimed in claim 13, wherein said substituting process means executes said predetermined support function without adding redundant data to the data related to said predetermined support function, or by adding redundant data, which has originated from said data related to said predetermined support function, to said data related to said predetermined support function.

16. A storage system as claimed in claim 13, wherein said storage system further comprises:
   selecting means for selecting operation modes of the substitution process operations of said predetermined support function provided by said substituting process means.

17. A storage system as claimed in claim 12, wherein said storage device system having the high function comprises:
   data guaranteeing means provided with at least two or more guarantee modes among:
   (1) a first guarantee mode for executing a data guaranteeing operation in such a manner that the data to be written is transferred to said storage device system having the low function so as to be held therein, said data held in said storage device system having the low function is read out, and said read data is compared with the data held in said storage device system having the high function;
   (2) a second guarantee mode for performing a data guaranteeing operation in such a manner that a guarantee code produced based upon said data which is to be written is held in said storage device system having the high function, and a guarantee code extracted from the data read out from said storage device system having the low function is compared with the guarantee code held in said storage device system having the high function; and
   (3) a third guarantee mode for executing a data guaranteeing operation in such a manner that the guarantee code produced based upon the data which is to be written is held in said storage device system having the high function, data with an attached guarantee code, which is constituted by relating said guarantee code to said data, is transferred to said storage device system having the low function so as to be held therein, and the guarantee code which is extracted from said data with the attached guarantee code read out from said storage device system having the low function is compared with the guarantee code held in said storage device system having the high function.

18. A storage system as claimed in claim 17, further comprising input/output selecting means by which a user selects among the first, second, and third guarantee modes.

19. A storage system as claimed in claim 12, further comprising input/output selecting means by which a user selects one of the following data guarantee modes provided for data guaranteeing means:
   (1) a first guarantee mode for executing a data guaranteeing operation in such a manner that the data to be written is transferred to said storage device system having the low function so as to be held therein, said data held in said storage device system having the low function is read out, and said read data is compared with the data held in said storage device system having the high function; and
   (2) a second guarantee mode for performing a data guaranteeing operation in such a manner that a guarantee code produced based upon said data which is to be written is held in said storage device system having the high function, and a guarantee code extracted from the data read out from said storage device system having the low function is compared with the guarantee code held in said storage device system having the high function.

20. A storage device system connected to an upper grade apparatus and different sorts of storage device systems respectively in a hetero-environment, wherein said storage device system comprises:
   receiving means for receiving data and a data writing request from said upper grade apparatus;
   data holding means for holding the data, which is required to be written in response to said received data writing request;
   transferring means for transferring to the different sorts of storage device systems, a copy of the data which is required to be written in response to said received data writing request; and
   data guaranteeing means for guaranteeing whether or not said data copied to and held in said different sorts of storage device systems corresponds to correct data;
   wherein in said hetero-environment, said storage device system employs a different guarantee function to guarantee the correct transfer of data during data transfer operations, than a guarantee function to guarantee the correct transfer of data employed by said different sorts of storage device systems connected thereto;
   wherein the data guaranteeing means is arranged to receive, from the different sorts of storage device systems, the data written to the different sorts of storage device systems and to store the data received from the different sorts of storage device systems at least until the guarantee; and also to receive, from the data holding means, the data held in the data holding means; and
   wherein according to the guarantee function employed by the storage device system, the data guaranteeing means compares the data received from the different sorts of storage device systems with the data received from the data holding means, judges whether the data received from the different sorts of storage device systems is identical to the data received from the data holding means, and if the data are not identical to each other, outputs an error notification, in response to which the transferring means again transfers the copy of the data to said different sorts of storage device systems.

21. A storage device system as claimed in claim 20, wherein said data guaranteeing means comprises:
   guarantee code producing means for producing a guarantee code based upon the data which is required to be written in the case in which said receiving means receives said data writing request;
   guarantee code holding means for holding said produced guarantee code;
   extracting means for extracting a guarantee code based upon the data read out from said different sorts of storage device systems; and
   comparing means for performing a data guaranteeing operation by comparing the guarantee code held by said guarantee code holding means with the guarantee code extracted by said extracting means.

22. A storage device system as claimed in claim 20, wherein said data guaranteeing means comprises:
   guarantee code producing means for producing a guarantee code based upon the data which is required to be written in the case in which said receiving means receives said data writing request;
   guarantee code holding means for holding said produced guarantee code; data-attached-with-guarantee-code transferring means operated in such a manner that, while both said produced guarantee code and said data which is required to be written are related to each other as data with an attached guarantee code, the data with the attached guarantee code is transferred and held to said different sorts of storage device systems by said transferring means;
   extracting means for extracting the guarantee code from said data with the attached guarantee code read out from said different sorts of storage device systems; and
   comparing means for executing a data guarantee operation by comparing the guarantee code held by said guarantee code holding means with the guarantee code extracted by said extracting means.

23. A storage device system as claimed in claim 20, wherein said data guaranteeing means is provided with at least two or more guarantee modes among:
   (1) a first guarantee mode for executing a data guaranteeing operation in such a manner that the data which is required to be written is transferred to said different sorts of storage device systems so as to be held therein, said data held in said different sorts of storage device systems is read out, and said read data is compared with the data held in said storage device system;
   (2) a second guarantee mode for performing a data guaranteeing operation in such a manner that a guarantee code produced based upon said data which is required to be written is held in said storage device system, and a guarantee code extracted from the data read out from said different sorts of storage device systems is compared with the guarantee code held in said storage device system; and
   (3) a third guarantee mode for executing a data guaranteeing operation in such a manner that the guarantee code produced based upon the said data which is required to be written is held in said storage device system, data with an attached guarantee code, which is constituted by relating said guarantee code to said data, is transferred to said different sorts of storage device systems so as to be held therein, and the guarantee code which is extracted from said data with the attached guarantee code read out from said different sorts of storage device systems is compared with the guarantee code held in said storage device system.

24. A storage device system as claimed in claim 23, further comprising input/output selecting means by which a user selects among the first, second, and third guarantee modes.

25. A storage device system as claimed in claim 20, further comprising input/output selecting means by which a user selects one of the following data guarantee modes provided for said data guaranteeing means:
   (1) a first guarantee mode for executing a data guaranteeing operation in such a manner that the data which is required to be written is transferred to said different sorts of storage device systems so as to be held therein, said data held in said different sorts of storage device systems is read out, and said read data is compared with the data held in said storage device system; and
   (2) a second guarantee mode for performing a data guaranteeing operation in such a manner that a guarantee code produced based upon said data which is required to be written is held in said storage device system, and a guarantee code extracted from the data read out from said different sorts of storage device systems is compared with the guarantee code held in said storage device system.

26. A computer-readable storage medium embodying executable code of a program for controlling a storage system connected to an upper grade apparatus and comprising different sorts of storage device systems in a hetero-environment, wherein said executable program code realizes:
   a local-sided holding function by which, in response to a data writing request received from said upper grade apparatus, data which is required to be written is held in storage means;
   a transferring function by which, in response to said received data write request, a copy of said data which is required to be written is transferred to said different sorts of storage device systems so as to be held therein; and
   a data guaranteeing function for guaranteeing as to whether or not said data copied to and held in said different sorts of storage device systems corresponds to correct data;
   wherein in said hetero-environment, said storage system employs a different guarantee function to guarantee the correct transfer of data during data transfer operations, than a guarantee function to guarantee the correct transfer of data employed by said different sorts of storage device systems connected thereto;
   wherein the data guaranteeing function receives, from the different sorts of storage device systems, the data written to the different sorts of storage device systems and to store the data received from the different sorts of storage device systems at least until the guarantee; and also receives, from the storage means, the data held in the storage means; and
   wherein according to the guarantee function employed by the storage system, the data guaranteeing function compares the data received from the different sorts of storage device systems with the data received from the storage means, judges whether the data received from the different sorts of storage device systems is identical to the data received from the storage means, and if the data are not identical to each other, outputs an error notification, in response to which the transferring function again transfers the copy of the data to said different sorts of storage device systems.

27. A computer readable storage medium embodying executable code of a program as claimed in claim 26, wherein said data guaranteeing function is provided with at least two or more guarantee modes among:
   (1) a first guarantee mode for executing a data guaranteeing operation in such a manner that the data which is required to be written is transferred to said different sorts of storage device systems so as to be held therein, said data held in said different sorts of storage device systems is read out, and said read data is compared with the data held in said storage system;
   (2) a second guarantee mode for performing a data guaranteeing operation in such a manner that a guarantee code produced based upon said data which is required to be written is held in said storage system, and a guarantee code extracted from the data read out from said different sorts of storage device systems is compared with the guarantee code held in said storage system; and (3) a third guarantee mode for executing a data guaranteeing operation in such a manner that the guarantee code produced based upon the said data which is required to be written is held in said storage system, data with an attached guarantee code, which is constituted by relating said guarantee code to said data, is transferred to said different sorts of storage device systems so as to be held therein, and the guarantee code which is extracted from said data with the attached guarantee code read out from said different sorts of storage device systems is compared with the guarantee code held in said storage system.

28. A computer readable storage medium embodying executable code of a program as claimed in claim 27, further comprising an input/output selecting function by which a user of said storage system selects among the first, second, and third guarantee modes.

29. A computer readable storage medium embodying executable code of a program as claimed in claim 26, further comprising an input/output selecting function by which a user of said storage system selects one of the following data guarantee modes provided for said data guaranteeing function:

(1) a first guarantee mode for executing a data guaranteeing operation in such a manner that the data which is required to be written is transferred to said different sorts of storage device systems so as to be held therein, said data held in said different sorts of storage device systems is read out, and said read data is compared with the data held in said storage system; and (2) a second guarantee mode for performing a data guaranteeing operation in such a manner that a guarantee code produced based upon said data which is required to be written is held in said storage system, and a guarantee code extracted from the data read out from said different sorts of storage device systems is compared with the guarantee code held in said storage system.

30. A storage system employed in a hetero-environment in which a main storage system is connected to a sub-storage system, the sort of which is different from the sort of said main storage system, for transmitting/receiving data between an upper grade apparatus and said storage system, wherein said main storage system comprises:

a receiver of data and a data writing request from said upper grade apparatus;
a data holder of the data which is required to be written in response to said received data writing request;
a transferor of a copy of the data which is required to be written, to said sub-storage system in response to said received data writing request; and
a data guarantor of whether or not said data copied to and held in said sub-storage system corresponds to correct data;
wherein in said hetero-environment, said main storage system and said sub-storage system connected thereto respectively employ different guarantee functions to guarantee the correct transfer of data during data transfer operations;
wherein the data guarantor is arranged to receive, from the sub-storage system, the data written to the sub-storage system and to store the data received from the sub-storage system at least until the guarantee; and also to receive, from the data holder, the data held in the data holder; and
wherein according to the guarantee function employed by the main storage, the data guarantor compares the data received from the sub-storage system with the data received from the data holder, judges whether the data received from the sub-storage system is identical to the data received from the data holder, and if the data are not identical to each other, outputs an error notification, in response to which the transferor again transfers the copy of the data to said sub-storage system.

31. A storage system as claimed in claim 30, wherein said sub-storage system is not provided with a data guarantee function which can be utilized from said main storage system.

32. A storage system as claimed in claim 30, wherein said data guarantor is provided with at least two or more guarantee modes among:

(1) a first guarantee mode for executing a data guaranteeing operation in such a manner that the data which is required to be written is transferred to said sub-storage system so as to be held therein, said data held in said sub-storage system is read out, and said read data is compared with the data held in said main storage system;

(2) a second guarantee mode for performing a data guaranteeing operation in such a manner that a guarantee code produced based upon said data which is required to be written is held in said main storage system, and a guarantee code extracted from the data read out from said sub-storage system is compared with the guarantee code held in said main storage system; and (3) a third guarantee mode for executing a data guaranteeing operation in such a manner that the guarantee code produced based upon the data which is required to be written is held in said main storage system, data with an attached guarantee code, which is constituted by relating said guarantee code to said data, is transferred to said sub-storage system so as to be held therein, and the guarantee code which is extracted from said data with the attached guarantee code read out from said sub-storage system is compared with the guarantee code held in said main storage system.

33. A storage system as claimed in claim 32, further comprising an input/output selector by which a user selects among the first, second, and third guarantee modes.

34. A storage system as claimed in claim 30, further comprising an input/output selector by which a user selects one of the following data guarantee modes provided for said data guarantor:

(1) a first guarantee mode for executing a data guaranteeing operation in such a manner that the data which is required to be written is transferred to said sub-storage system so as to be held therein, said data held in said sub-storage system is read out, and said read data is compared with the data held in said main storage system; and (2) a second guarantee mode for performing a data guaranteeing operation in such a manner that a guarantee code produced based upon said data which is required to be written is held in said main storage system, and a guarantee code extracted from the data read out from said sub-storage system is compared with the guarantee code held in said main storage system.

* * * * *